US008942686B2

(12) United States Patent
Wright et al.

(10) Patent No.: US 8,942,686 B2
(45) Date of Patent: *Jan. 27, 2015

(54) PROVIDING AND MANAGING BYPASS OF ENHANCED SERVICES

(75) Inventors: Andrew S. Wright, Vancouver (CA); Stephen J. Williams, Port Coquitlam (CA); Leo Nikkari, Vancouver (CA)

(73) Assignee: Aegis Mobility, Inc., Vancouver (CA)

( * ) Notice: Subject to any disclaimer, the term of this patent is extended or adjusted under 35 U.S.C. 154(b) by 219 days.

This patent is subject to a terminal disclaimer.

(21) Appl. No.: 12/554,750

(22) Filed: Sep. 4, 2009

(65) Prior Publication Data

US 2010/0144324 A1   Jun. 10, 2010

Related U.S. Application Data

(60) Provisional application No. 61/094,835, filed on Sep. 5, 2008.

(51) Int. Cl.
*H04M 3/42* (2006.01)
*H04W 24/00* (2009.01)
(Continued)

(52) U.S. Cl.
CPC ............ *H04W 4/16* (2013.01); *H04M 3/42068* (2013.01); *H04M 3/42348* (2013.01);
(Continued)

(58) Field of Classification Search
CPC ............ H04W 4/02–4/046; H04W 8/18–8/22; H04W 76/007; H04M 3/51; H04M 3/42068; H04M 3/42348; H04M 2203/2072; H04M 2242/30

USPC ...................... 455/456.1, 414.1, 404.1, 456.4
See application file for complete search history.

(56) References Cited

U.S. PATENT DOCUMENTS 5,852,775 A   12/1998   Hidary
5,862,476 A   1/1999   Hasegawa
(Continued)

FOREIGN PATENT DOCUMENTS

CN   101087475 A   12/2007
CN   101369912 A   2/2009
(Continued)

OTHER PUBLICATIONS

Office Action issued in European Patent Application No. 09810968.9 dated Nov. 6, 2013.
Response to Office Action issued in European Patent Application No. 09810968.9 dated Nov. 6, 2013, which was filed on May 5, 2014.

*Primary Examiner* — Dwayne Bost
*Assistant Examiner* — Nalini Mummalaneni
(74) *Attorney, Agent, or Firm* — Knobbe, Martens, Olson & Bear, LLP

(57) ABSTRACT

A communication environment includes of one or more subscriber terminals capable of initiating emergency voice calls over a telephony network. The subscriber terminal further send messages over either a data network or a telephony signaling network to a communication management system. The communication management system receives messages from a subscriber terminal, either via a data network or a telephony signaling network. It also consists of one or more telephony switching nodes capable of querying the emergency context node for a called party emergency context. It also consists of one or more servers that provide advanced call control services.

36 Claims, 25 Drawing Sheets

(51) Int. Cl.
*H04M 11/00* (2006.01)
*H04W 4/00* (2009.01)
*H04L 12/66* (2006.01)
*H04W 4/16* (2009.01)
*H04W 4/22* (2009.01)
*H04W 8/18* (2009.01)
*H04W 76/00* (2009.01)

(52) U.S. Cl.
CPC ... *H04M2203/2072* (2013.01); *H04M 2242/30* (2013.01); *H04W 4/22* (2013.01); *H04W 8/18* (2013.01); *H04W 76/007* (2013.01)
USPC ............... 455/417; 455/414.1; 455/456.3; 455/418; 455/456.1; 370/328; 370/352; 370/338

(56) References Cited

U.S. PATENT DOCUMENTS

| | | | |
|---|---|---|---|
| 5,890,061 A | 3/1999 | Timm et al. | |
| 5,890,067 A | 3/1999 | Chang et al. | |
| 5,963,550 A | 10/1999 | Hirata et al. | |
| 6,108,532 A | 8/2000 | Matsuda et al. | |
| 6,154,172 A | 11/2000 | Piccionelli et al. | |
| 6,198,927 B1 | 3/2001 | Wright et al. | |
| 6,208,866 B1 | 3/2001 | Rouhollahzadeh et al. | |
| 6,263,190 B1 | 7/2001 | Mamori et al. | |
| 6,311,078 B1 | 10/2001 | Hardouin | |
| 6,353,778 B1 | 3/2002 | Brown | |
| 6,389,287 B1 | 5/2002 | Smith et al. | |
| 6,418,309 B1 | 7/2002 | Moon et al. | |
| 6,496,709 B2 | 12/2002 | Murray | |
| 6,505,046 B1 | 1/2003 | Baker | |
| 6,526,275 B1 | 2/2003 | Calvert | |
| 6,546,257 B1 | 4/2003 | Stewart | |
| 6,580,973 B2 | 6/2003 | Leivian et al. | |
| 6,594,483 B2 | 7/2003 | Nykanen et al. | |
| 6,598,034 B1 | 7/2003 | Kloth et al. | |
| 6,600,975 B2 | 7/2003 | Moriguchi et al. | |
| 6,647,257 B2 | 11/2003 | Owensby | |
| 6,647,269 B2 | 11/2003 | Hendrey et al. | |
| 6,650,894 B1 | 11/2003 | Berstis et al. | |
| 6,678,516 B2 | 1/2004 | Nordman et al. | |
| 6,687,497 B1 | 2/2004 | Parvulescu et al. | |
| 6,690,940 B1 | 2/2004 | Brown et al. | |
| 6,701,158 B2 | 3/2004 | Moreth | |
| 6,714,519 B2 | 3/2004 | Luzzatti et al. | |
| 6,728,542 B2 * | 4/2004 | Meda ........................... | 455/445 |
| 6,731,925 B2 | 5/2004 | Naboulsi | |
| 6,771,946 B1 | 8/2004 | Oyaski | |
| 6,804,524 B1 | 10/2004 | Vandermeijden | |
| 6,807,435 B2 | 10/2004 | Yamashita | |
| 6,816,731 B1 | 11/2004 | Maruyama | |
| 6,819,928 B1 | 11/2004 | Hokao | |
| 6,832,093 B1 | 12/2004 | Ranta | |
| 6,847,822 B1 | 1/2005 | Dennison et al. | |
| 6,847,927 B2 | 1/2005 | Hoffman et al. | |
| 6,885,869 B2 | 4/2005 | Raith | |
| 6,922,571 B1 | 7/2005 | Kinoshita | |
| 6,934,547 B2 | 8/2005 | Suzuki | |
| 6,961,561 B2 | 11/2005 | Himmel et al. | |
| 6,973,333 B1 | 12/2005 | O'Neil | |
| 6,978,136 B2 | 12/2005 | Jenniges et al. | |
| 7,003,525 B1 | 2/2006 | Horvitz et al. | |
| 7,006,793 B2 | 2/2006 | Himmel et al. | |
| 7,015,831 B2 | 3/2006 | Karlsson et al. | |
| 7,042,391 B2 | 5/2006 | Meunier et al. | |
| 7,064,656 B2 | 6/2006 | Belcher et al. | |
| 7,072,753 B2 | 7/2006 | Eberle et al. | |
| 7,110,749 B2 | 9/2006 | Zellner et al. | |
| 7,149,627 B2 | 12/2006 | Ockerse et al. | |
| 7,181,228 B2 | 2/2007 | Boesch | |
| 7,242,946 B2 | 7/2007 | Kokkonen et al. | |
| 7,269,627 B2 | 9/2007 | Knauerhase | |
| 7,330,895 B1 | 2/2008 | Horvitz | |
| 7,359,713 B1 | 4/2008 | Tiwari | |
| 7,359,714 B2 | 4/2008 | Parupudi et al. | |
| 7,394,791 B2 | 7/2008 | Proctor, Jr. | |
| 7,403,785 B2 | 7/2008 | Daniels et al. | |
| 7,430,724 B2 | 9/2008 | Othmer | |
| 7,809,379 B2 | 10/2010 | Kim | |
| 7,813,741 B2 | 10/2010 | Hendrey et al. | |
| 7,979,057 B2 | 7/2011 | Ortiz et al. | |
| 8,000,689 B2 | 8/2011 | Featherstone et al. | |
| 8,045,976 B2 | 10/2011 | Kiddie et al. | |
| 8,055,279 B2 | 11/2011 | Murakami | |
| 8,103,292 B2 | 1/2012 | Kelly et al. | |
| 8,224,353 B2 | 7/2012 | Wright et al. | |
| 8,346,265 B2 | 1/2013 | Strub et al. | |
| 8,380,176 B2 | 2/2013 | Adler et al. | |
| 8,483,710 B2 | 7/2013 | Casey et al. | |
| 8,526,942 B2 | 9/2013 | Kiddie et al. | |
| 2002/0168981 A1 * | 11/2002 | Meda ........................... | 455/441 |
| 2002/0198004 A1 | 12/2002 | Heie et al. | |
| 2003/0114160 A1 | 6/2003 | Verkama et al. | |
| 2003/0129995 A1 | 7/2003 | Niwa et al. | |
| 2003/0137408 A1 | 7/2003 | Breiner | |
| 2003/0143988 A1 | 7/2003 | Jamadagni | |
| 2004/0023670 A1 | 2/2004 | Merheb | |
| 2004/0092253 A1 | 5/2004 | Simonds et al. | |
| 2004/0156333 A1 | 8/2004 | Bush | |
| 2004/0166878 A1 | 8/2004 | Erskine | |
| 2004/0198332 A1 | 10/2004 | Lundsgaard | |
| 2004/0203766 A1 | 10/2004 | Jenniges et al. | |
| 2004/0203900 A1 | 10/2004 | Cedervall et al. | |
| 2004/0248589 A1 | 12/2004 | Gwon et al. | |
| 2004/0253963 A1 | 12/2004 | Park et al. | |
| 2005/0037760 A1 | 2/2005 | Maruyama | |
| 2005/0070298 A1 * | 3/2005 | Caspi et al. ................ | 455/456.1 |
| 2005/0096026 A1 | 5/2005 | Chitrapu et al. | |
| 2005/0119002 A1 | 6/2005 | Bauchot et al. | |
| 2005/0153680 A1 | 7/2005 | Yoshioka et al. | |
| 2005/0255874 A1 | 11/2005 | Stewart-Baxter et al. | |
| 2005/0261011 A1 | 11/2005 | Scott | |
| 2005/0264404 A1 | 12/2005 | Franczyk et al. | |
| 2006/0040640 A1 | 2/2006 | Thompson et al. | |
| 2006/0046765 A1 | 3/2006 | Kogure | |
| 2006/0058036 A1 | 3/2006 | Watanabe et al. | |
| 2006/0099940 A1 * | 5/2006 | Pfleging et al. ............ | 455/419 |
| 2006/0099959 A1 | 5/2006 | Staton et al. | |
| 2006/0099969 A1 | 5/2006 | Staton et al. | |
| 2006/0104297 A1 | 5/2006 | Buyukkoc et al. | |
| 2006/0116807 A1 | 6/2006 | Hijikata | |
| 2006/0148490 A1 * | 7/2006 | Bates et al. ................ | 455/456.1 |
| 2006/0211412 A1 | 9/2006 | Vance | |
| 2006/0217130 A1 | 9/2006 | Rowitch et al. | |
| 2006/0229058 A1 | 10/2006 | Rosenberg | |
| 2006/0234746 A1 | 10/2006 | Bouat | |
| 2006/0246918 A1 | 11/2006 | Fok et al. | |
| 2006/0293842 A1 | 12/2006 | Casino | |
| 2007/0016643 A1 | 1/2007 | Boss et al. | |
| 2007/0072553 A1 | 3/2007 | Barbera | |
| 2007/0072616 A1 | 3/2007 | Irani | |
| 2007/0082678 A1 | 4/2007 | Himmelstein | |
| 2007/0287474 A1 | 12/2007 | Jenkins et al. | |
| 2008/0061988 A1 | 3/2008 | Mock et al. | |
| 2011/0009107 A1 | 1/2011 | Guba et al. | |
| 2011/0021234 A1 | 1/2011 | Tibbitts et al. | |
| 2012/0244883 A1 | 9/2012 | Tibbitts et al. | |

FOREIGN PATENT DOCUMENTS

| | | | |
|---|---|---|---|
| EP | 1931109 | A1 | 6/2008 |
| EP | 1931109 | A1 | 6/2008 |

(56) References Cited

FOREIGN PATENT DOCUMENTS

| FR | 2847409 A1 | 11/2002 |
| WO | WO 02/25970 A1 | 3/2002 |
| WO | WO2006/070253 A2 | 7/2006 |
| WO | WO2006/070253 A2 | 7/2006 |
| WO | WO2008/109477 A1 | 9/2008 |

* cited by examiner

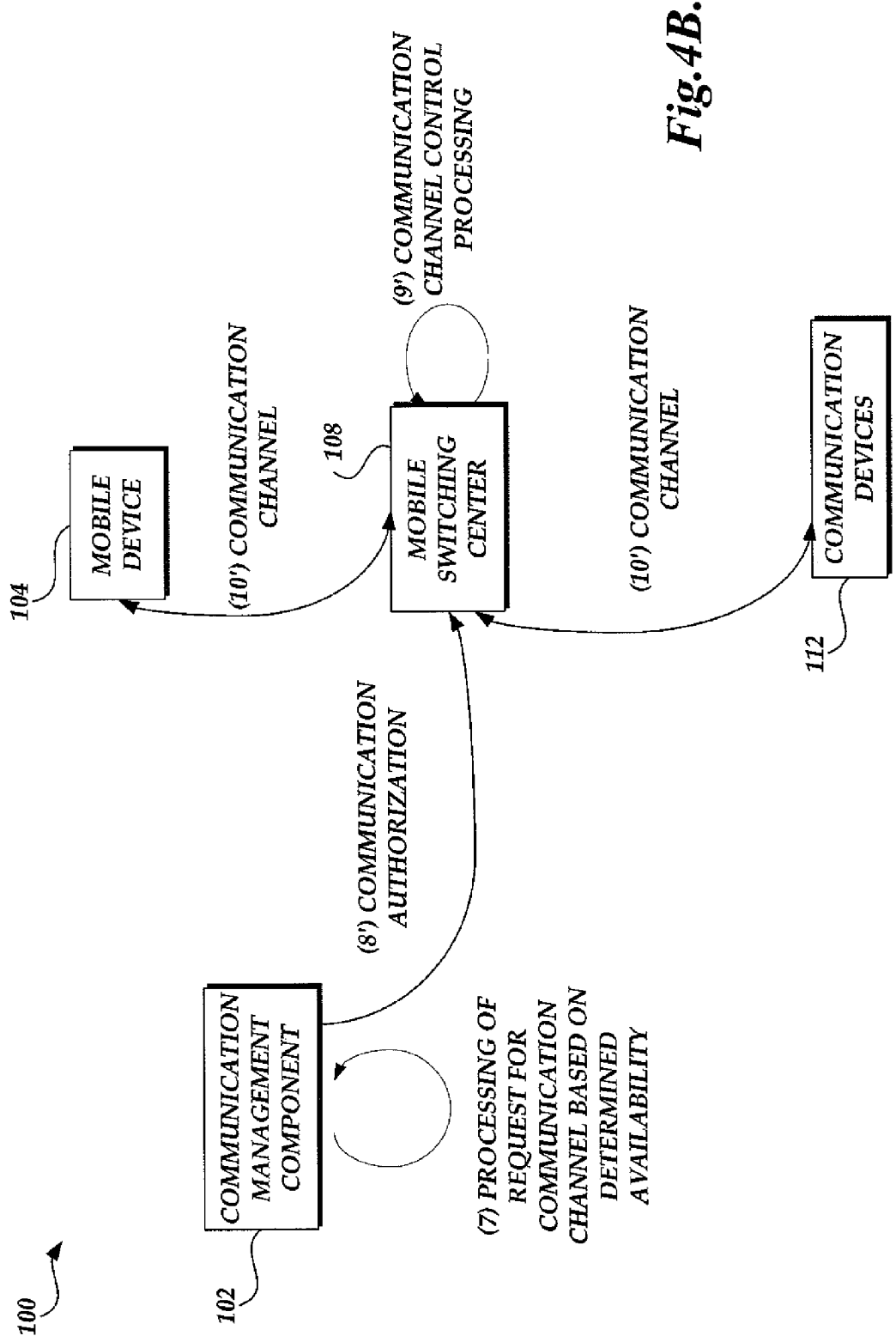

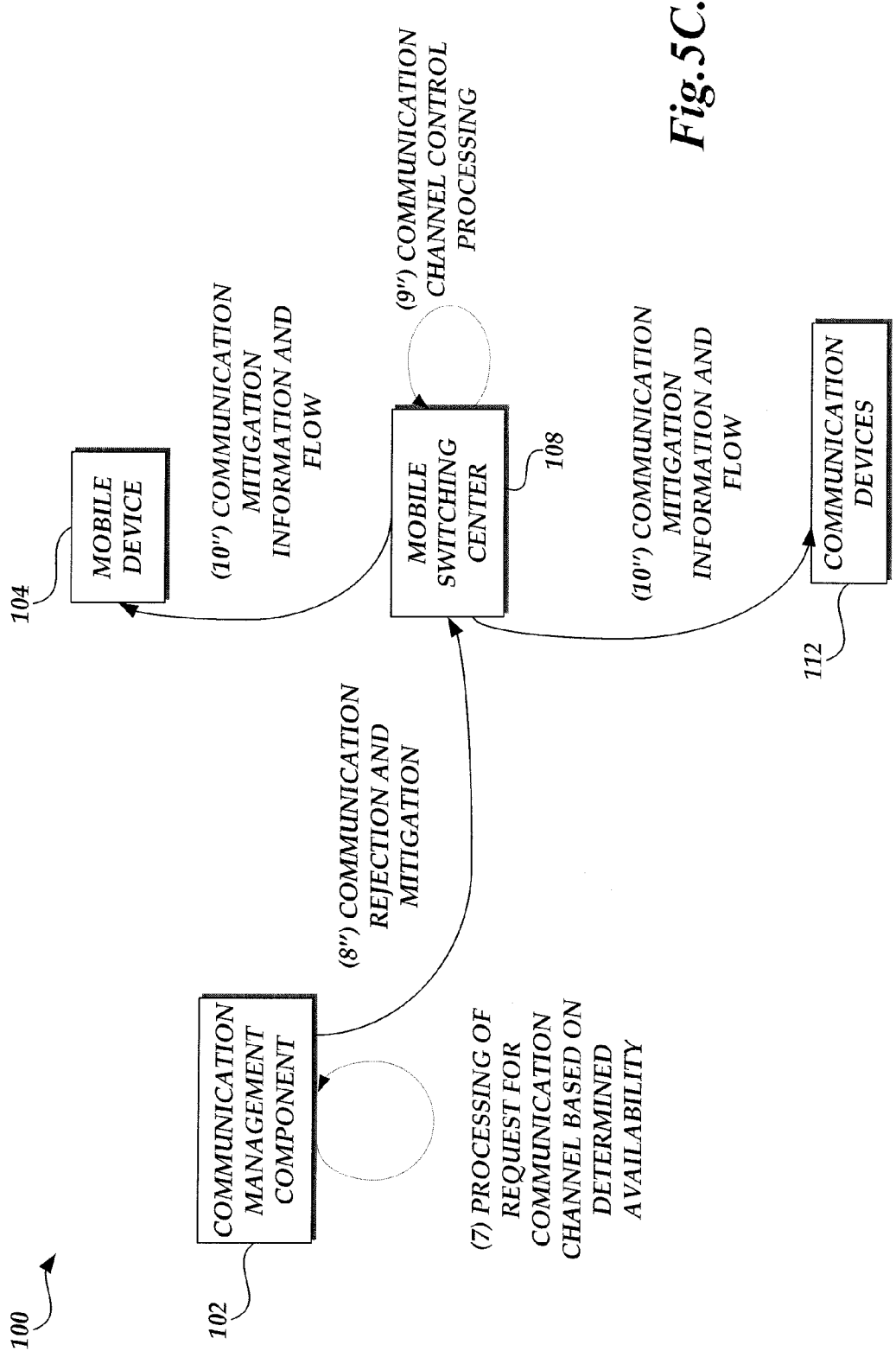

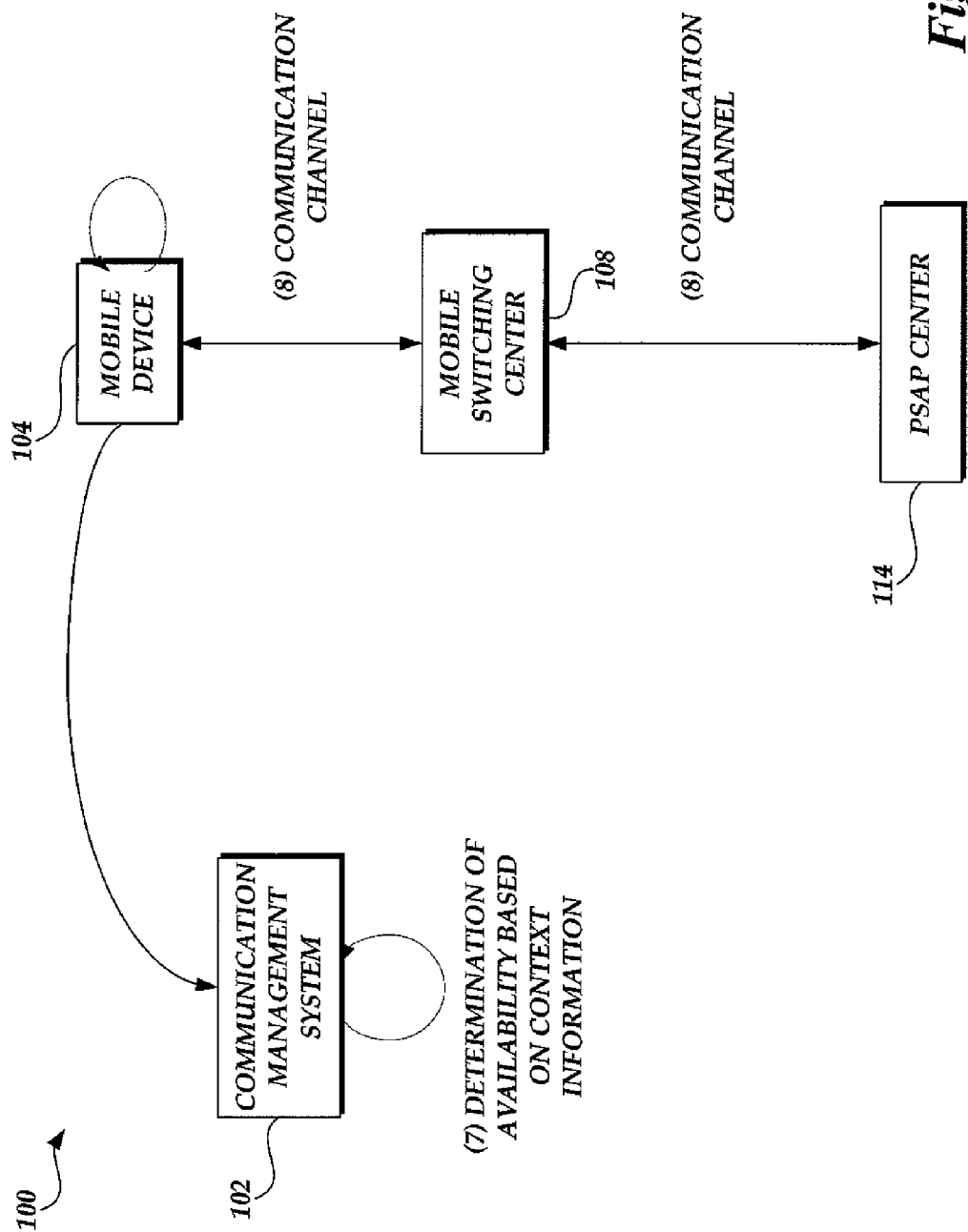

US 8,942,686 B2

PROVIDING AND MANAGING BYPASS OF ENHANCED SERVICES

CROSS-REFERENCE TO RELATED APPLICATION

This application claims the benefit of U.S. Provisional Application No. 61/094,835, entitled SUSPENDING MEDIATED SERVICES, and filed Sep. 5, 2008, the entirety of which is incorporated herein by reference.

BACKGROUND

In a fixed telephone network or mobile network, emergency calls are given a higher priority than normal calls to ensure the greatest possibility that they are completed successfully. In the event that an emergency call completes to a public safety answering point ("PSAP") center and then subsequently is disconnected prematurely, it is the obligation of the PSAP center to call back to the originator of the emergency call.

A potential conflict exists between this requirement and advanced telephony services provided by fixed wire-line and mobile wireless operators that perform any form of mediation on incoming calls (e.g. caller screening, selective call blocking, etc.). For example, a prepaid service that bars call completion to subscribers with a zero balance in their account may inadvertently block a PSAP center call to a subscriber who initiated an emergency call that was dropped.

The issue that arises is that a mobile or fixed line carrier can easily recognize an initiated emergency call by the dialed digits, "911" in North America, "112" in Europe, yet no easy or reliable method is available to identify the PSAP center numbers, therefore services that mediate incoming calls may inadvertently block PSAP center call backs. To avoid conflicts with PSAP call back, incoming calls are not screened. However, failure to screen incoming call limits the effectiveness of any potential call screening service.

In another approach, a processing server at an advanced screening service maintains a number list of all PSAP centers. All calls subject to possible blocking are screened according to the list. If the incoming call number is recognized as a PSAP center, the call is completed immediately without applying any further call screening services. However, lists of appropriate PSAP numbers are difficult to maintain. PSAP centers with multiple telephone lines change numbers on a regular basis. In smaller rural regions, the emergency calls are very often routed to a local sheriff using a cell phone; this assignment can change on a daily basis based on shift rotations in the sheriff's office. These remote office lines, agency issued mobile devices or personal devices may not be recorded in the PSAP call center database.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A-4C are block diagrams of the communication management system of FIG. 1 illustrating the transmission of mobile communication device context information by a mobile device and the processing by the communication management system of communication channel initiation requests submitted by a third party communication device;

FIGS. 5A-5C are block diagrams of the communication management system of FIG. 1 illustrating the transmission of mobile communication device context information by a mobile device and the processing by the communication management system of communication channel initiation requests submitted by the mobile communication device;

FIGS. 12A-12C are block diagrams of the communication management system of FIG. 1 illustrating the bypassing of mitigation techniques by the communication management system for communications between a mobile communication device and PSAP center;

DETAILED DESCRIPTION

The present disclosure consists of one or more mobile devices capable of initiating emergency voice calls over a telephony network. The mobile devices further send messages over either a data network or a telephony signaling network to a communication management component. The emergency context server receives messages from a subscriber terminal, either via a data network or a telephony signaling network. It also consists of one or more telephony switching nodes capable of querying the communication management component for a called party emergency context. It also consists of one or more servers that provide advanced call control services.

Although aspects of the system will be described to the drawings, flow diagrams, screen interfaces, and specific examples, one skilled in the relevant art will appreciate that the disclosed embodiments are illustrative in nature. Accordingly, the disclosed embodiments should not be construed as limiting.

System Overview

Figure 1:
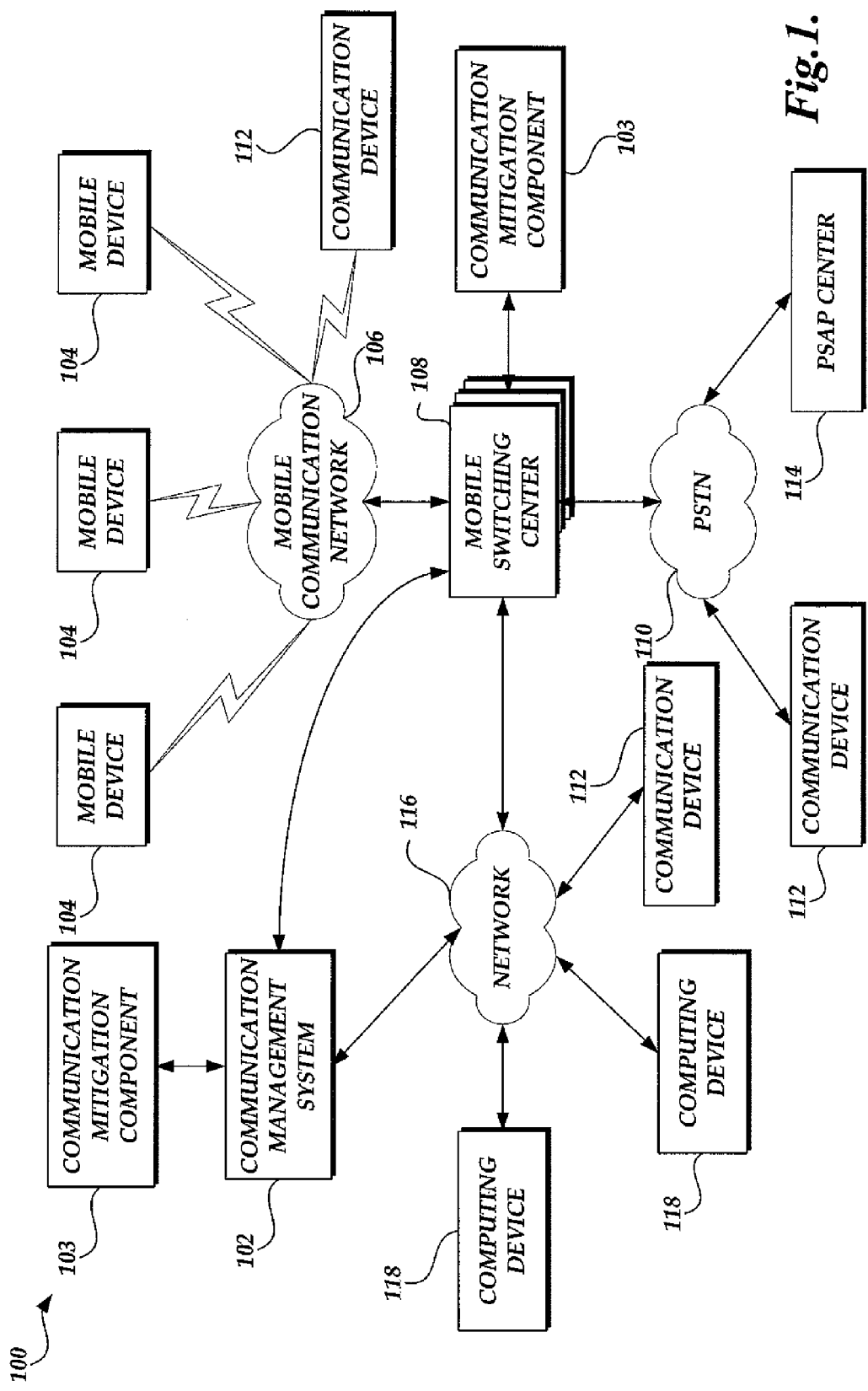
FIG. 1 is a block diagram illustrative of one embodiment of a communication management environment including a communication management system and a number of mobile communication devices.

With reference now to FIG. 1, a block diagram illustrative of a communication management environment 100 for managing mobile communication device communications will be described. As illustrated in FIG. 1, the communication management environment 100 includes a communication management system 102 for processing requests for establishing a communication channel between a supported mobile device and a third party communication device. The communication management system 102 maintains mobile communication device profiles that are provisioned to establish the availability for the mobile communication device to establish a communication channel as a function of mobile communication device context information. The communication device profiles may also be provisioned as a function of identification information of an applicable third party. As will also be described in greater detail below, the communication management system 102 determines the availability of the mobile device to establish a communication channel asynchronously to any request to establish a communication channel.

To manage requested communications or previously established communication channels, the communication management system 102 communicates with corresponding subsystems responsible for establishing the wireless communication channel, such as mobile switching center 108, and utilizes the predetermined availability information and appropriate identification information to allow/reject communications. The communication management system 102 can communicate with the mobile switching center 108 via a direct communication connection, a secure communication channel via a communication network, such as communication network 114, or via a public communication network.

Additionally, the communication management system 102 provides communication channel mitigation options in the event that the mobile communication device is unavailable, which can include interfacing with a communication mitigation components 103, such as a voice mail system or an interactive voice response system. Still further, the communication management system 102 facilitates the generation of various graphical user interfaces for provisioning and/or managing mobile communication device profiles via computing devices 116. Illustrative components of the mobile communication management system will be described in greater detail with regard to FIG. 2.

With continued reference to FIG. 1, the communication management environment 100 can include a number of mobile communication devices 104. The mobile communication devices 104 can correspond to wide variety of devices or components that are capable of initiating, receiving or facilitating communications over a communication network including, but not limited to, personal computing devices, hand-held computing devices, integrated components for inclusion in computing devices, home electronics, appliances, vehicles, and/or machinery, mobile telephones, modems, personal digital assistants, laptop computers, gaming devices, and the like. In an illustrative embodiment, the mobile communication devices 104 include a wide variety of software and hardware components for establishing communications over one or more communication networks, including wireless or wired mobile communication networks 106. The mobile communication devices 104 can be associated with one or more users for managing communication channel requests and existing communication channels according mobile communication device contexts. Illustrative components of a mobile communication device will be described in greater detail with regard to FIG. 3.

With continuing reference to FIG. 1, an illustrative communication management environment 100 can include a number of additional components, systems and/or subsystems for facilitating communications with the mobile communication devices 104 and/or the communication management system 102. The additional components can include one or more mobile switching centers 108 for establishing communications with the mobile communication devices 104 via the mobile communication network 106, such as a cellular radio access network, a wireless network based on the family of IEEE 802.11 technical standards (e.g., "WIFI™"), a wireless network based on IEEE 802.16 standards (e.g., "WiMax"), and other wireless networks. The operation of mobile communication networks, such as mobile communication network 106 are well known and will not be described in greater detail.

As illustrated in FIG. 1, the mobile switch center 108 includes interfaces for establishing various communications with via the communication network 116, such as the Internet, intranets, private networks, and point-to-point networks. In one example, the mobile switch center 108 can include interfaces for establishing communication channels with various communication devices 112, such as landline telephones, via a public switched telephone network (PSTN) 110. As will be described in greater detailed below, the mobile switch center 108 can facilitate communication channels between the mobile devices 104, the communication management system 102 and a PSAP center 114.

The mobile switch center 108 can also include interfaces for establishing communication channels with various communication network-based communication devices 112, such as a VoIP communication device. Still further, the mobile switch center 108 can include interfaces for establishing communication channels with a mobile-based communication device 112, such as another mobile communication device. For example, the communication devices 112 can correspond to a third-party mobile communication that establishes an audio communication channel with a mobile communication device 104. Accordingly, although communication network 116 is illustrated as a single communication network, one skilled in the relevant art will appreciate that the communication network can be made up of any number of public or private communication networks and/or network connections.

The various communication devices 112 can include the hardware and software components that facilitate the various modes of operation and communication, such as via wired and wireless communication networks. Additionally, the computing devices 118 can include various hardware and software components, such as a browser software application, that facilitate the generation of the graphical user interfaces for provisioning and managing mobile communication device profiles as will be described below.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

Figure 2:
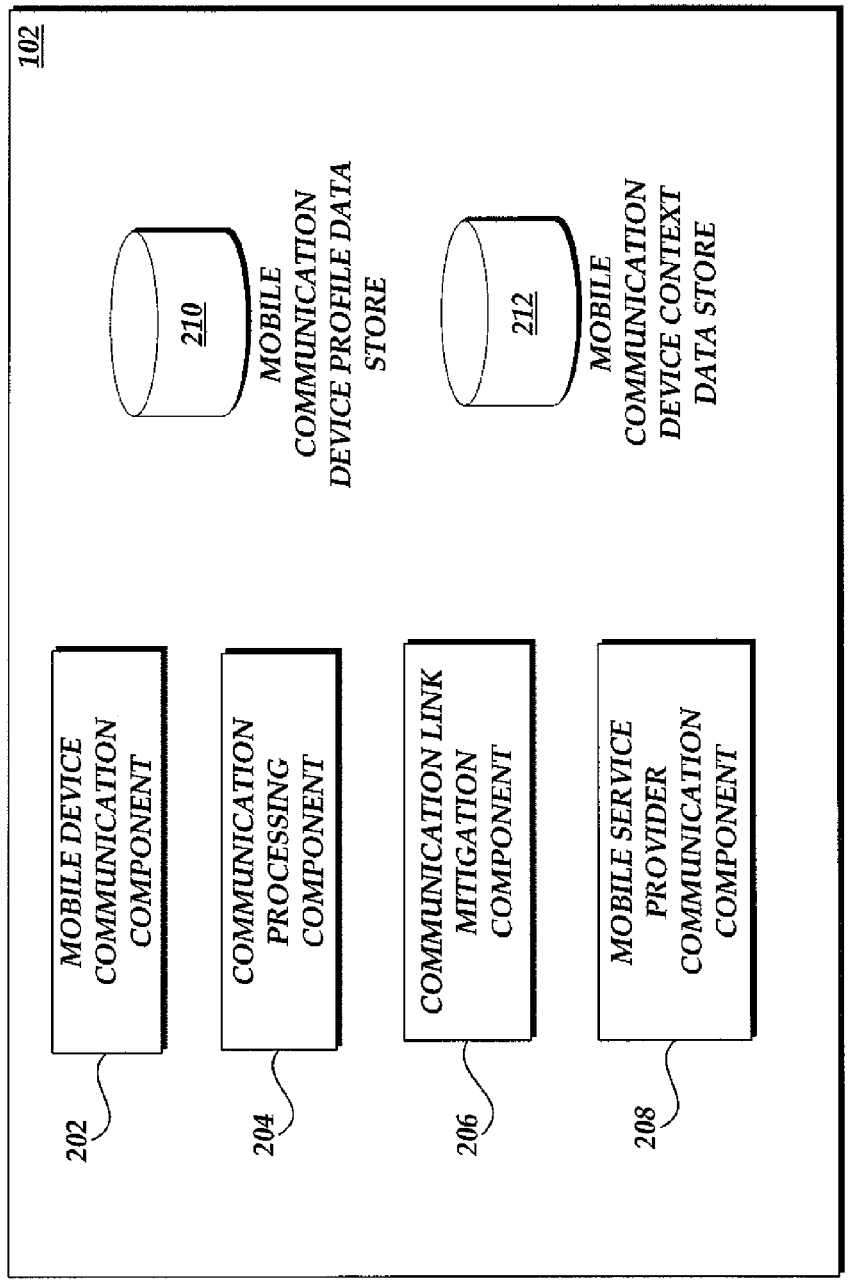
FIG. 2 is a block diagram illustrative of aspects of the communication management system of FIG. 1 in an embodiment of the communication management environment.

With reference now to FIG. 2, illustrative components for the communication management system 102 will be described. Although the operation of the various functions associated with the communication management system 102 will be described with regard to below subcomponents, one skilled in the relevant art will appreciate that the subcomponents are illustrative in nature. Accordingly, a communication management system 102 may include additional components or alternative components to facilitate one or more functions. Additionally, although the various subcomponents are illustrated as integrated into a communication management system 102, one or more of the components may be implemented in a distributed manner over a communication network and/or be implemented as a network service, e.g., a Web service.

As illustrated in FIG. 2, the communication management system 102 includes a mobile device communication component 202 for establishing communications with a mobile communication device 104. In an illustrative embodiment, the mobile device communication component 202 corresponds to a component for facilitating the bi-lateral transfer of data, such as mobile device context information, context assessment algorithms, etc., between the mobile communication device 104 and the communication management system 102. The mobile device communication component 202 can include software and hardware components necessary to establish one or more communication channels corresponding to various communication protocols such as BLUETOOTH™, the family of IEEE 802.11 technical standards (e.g., "WIFI™"), the IEEE 802.16 standards (e.g., "WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA and similar technologies).

The communication management system 102 can also include a communication processing component 204 for determining the availability of a mobile communication device 104 for communication channels based on processing mobile communication device context information according to a mobile communication device profile. The communication processing component 204 can execute various processes or algorithms for processing transmitted mobile communication device context information to determine mobile communication device availability. Additionally, the communication processing component 204 can also manage the various context assessment processes or algorithms and updates to existing previously stored context assessment processes and algorithms that are transmitted and executed by the mobile communication devices 104. Still further, the communication processing component 204 processes requests for communications between the mobile communication device 104 and third parties based on the predetermined availability information and identification information (e.g., the caller ID of a specific third party caller). Still further, the communication processing component 204 can further manage mobile device 104 context state to determine whether mitigation services should be applied to a communication request based on exception rules. such as an emergency bypass context state.

With continued reference to FIG. 2, the communication management system 102 can include a communication mitigation component 206 for processing alternative communication options if a requested communication channel is unavailable or if an existing communication is to be terminated due to a change in mobile communication device context. As previously discussed, the communication mitigation component 206 can interface with existing communication components, or subsystems, such as mitigation components 103 for providing user voicemail functionality or accessing existing voicemail services hosted by the mobile switching center 108. Additionally, the communication mitigation component 206 can provide additional data and/or instructions for establishing alternative communication channels between the mobile device and a third party communication device 112, such as providing interactive voice response functionality, as will be explained in greater detail below. Still further, the communication management system 102 can include a mobile service provider communication component 208 for processing requests for establishing communications, which includes indicating to a mobile switching center 108 whether to allow a requested communication channel to be established and/or indicating whether to terminate an existing communication channel. Although the communication management system 102 is illustrated a functional to implement multiple functions, one skilled in the relevant art will appreciate that the communication management system 102 may be arranged as a collection of separate component directed to carry out one or more functions associated with the communication management system. For example, a bypass state server may be configured for purposes of determining whether call mitigation techniques should be bypassed.

The communication management system 102 can further include a mobile communication device profile data store 210 for maintaining mobile communication device profiles. The mobile communication device profile data store 210 may be one or more databases configured to provide the communication processing component 204 required data to determine mobile communication device availability according to mobile communication device context. As will be described in greater detail below, the mobile communication device profile data defines the availability of the mobile communication device 104 as a function of a current mobile communication device context. A mobile communication device profile can be defined such that the determined mobile communication device applicability will be applicable to all third party users, groups of users or specific users. For example, profiles can be associated with a telephone number such that the communication manage system 102 can select an appropriate profile (and its predetermined availability) based on identification information associated with a communication request, such as caller identity information. Accordingly, the mobile communication device profile information in the communication device profile data store 210 can be stored in a manner that facilitates that faster retrieval according to identification information, as will be described in greater detail below. Still further, in another embodiment, the mobile communication device context data store 212 can be utilized to mitigate the initiation of mitigation services in the event a mobile device 104 is in specific context states, such as an emergency context state.

With continued reference to FIG. 2, the communication management system 102 can also include a mobile communication device context data store 212 for maintaining mobile communication device context information previously transmitted by the mobile communication devices 104 and/or for maintaining the mobile communication device context assessment algorithms utilized by the mobile communication devices to process inputs into mobile communication device context. In one embodiment, the mobile communication device context information may be accessible, or otherwise published, to other computing devices, network based services, or users via the communication network 114.

Figure 3:
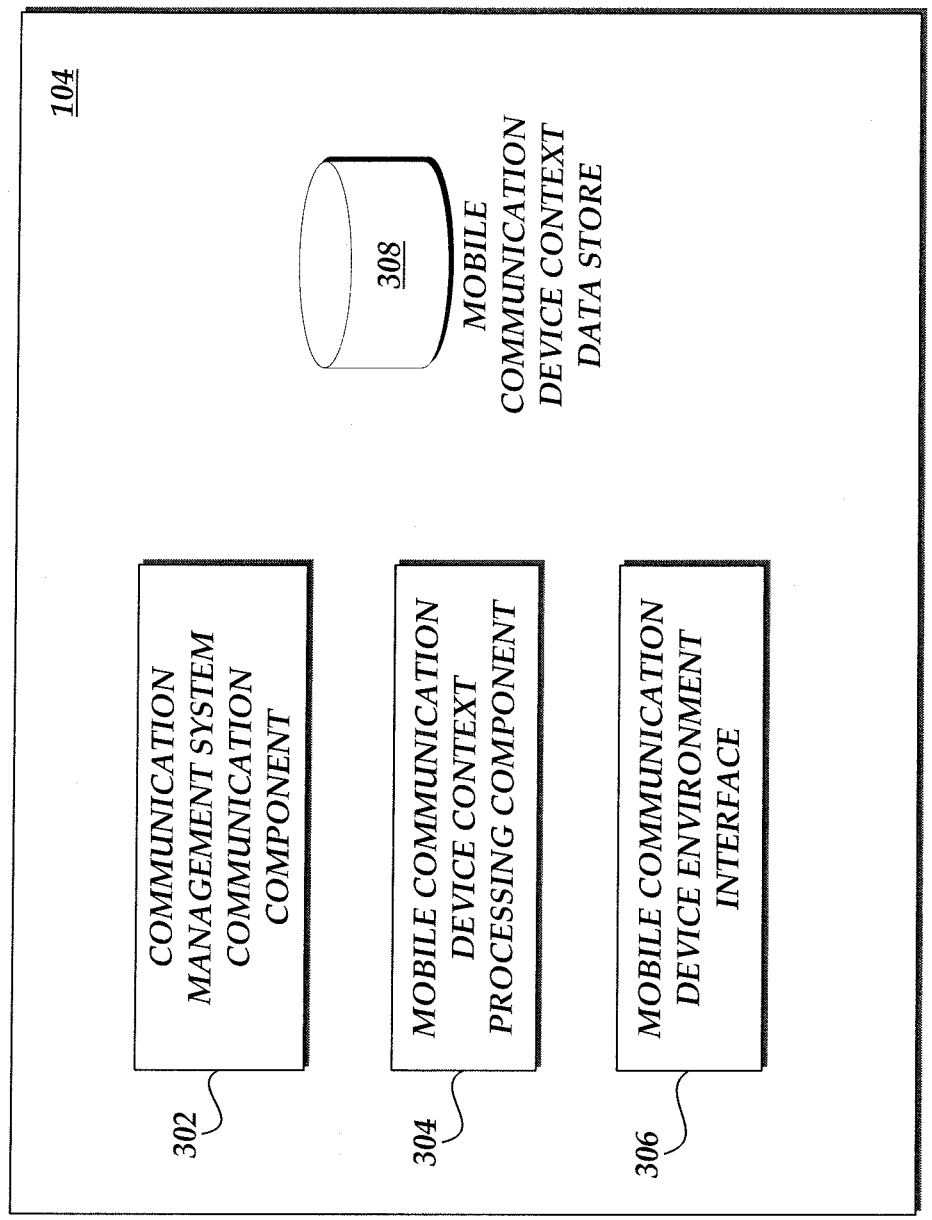
FIG. 3 is a block diagram illustrative of aspects of the mobile communication device of FIG. 1 in an embodiment of the communication management environment.

With reference now to FIG. 3, illustrative components for the mobile communication device 104 will be described. Although the operation of the various functions associated with the mobile device 104 will be described with regard to below components, one skilled in the relevant art will appreciate that the components are illustrative in nature. Accordingly, a mobile device 104 may include additional components or alternative components to facilitate one or more functions. Additionally, although the various subcomponents are illustrated as integrated into a mobile device 104, one or more of the components may be implemented in a distributed matter over a communication network and/or be implemented as a network service, e.g., a Web service.

As illustrated in FIG. 3, the mobile device 104 includes a communication management system communication component 302 for facilitating communications with the communication management system 102. As described above with regard to the mobile device communication component 202 (FIG. 2), the communication management system communication component 302 facilitates the bi-lateral transfer of data between the mobile communication device 104 and the communication management system 102. One skilled in the relevant art will appreciate that the communication management system communication component 302 can include software and hardware components necessary to establish one or more communication channels corresponding to various communication protocols for establishing the bi-lateral communication channels. Moreover, although the communication management system communication component 302 is illustrated as a separate component, the functionality of the component may be integrated, or otherwise combined, with one or more hardware or software components utilized by the mobile communication device 104 to make communication channels (e.g., cellular communication channels or SMS communication channels as part of the designed function of the mobile device).

As will be described in greater detail below, the communication management system communication component 302 transmits current mobile device context information in accordance with the context assessment algorithms on the mobile device 104. Once a current mobile communication device context is established, the communication management system 302 can limit additional transmission of context information upon detection of a change in mobile communication context information. Additionally, in an alternative embodiment, the communication management system communication component 302 may also transmit, or otherwise publish, mobile communication device context information to additional recipients, such as communication network resources such as Web sites or network services, and/or to other peer destinations.

The mobile communication device 104 can also include a mobile communication device context information component 304 for processing a set of inputs corresponding to a mobile device environment to determine mobile device context information. Illustrative context assessment algorithms or processes for determining mobile device context information will be described in greater detail below. The mobile communication device contexts can identify or describe aspects of the mobile communication device 104, aspects of the mobile communication device environment, and/or aspects of the user associated with the mobile communication device. For example, the mobile communication device context corresponds to a determination of various states of movement/travel, such as in a non-transitory state, an in-transit state (including city/urban travel transit, highway transit, and in-flight transit states), a journey onset state, and a journey termination state. In another example, the mobile communication device context corresponds to a determination of whether a mobile communication device's present location is within a geospatial boundary, also referred to as geofencing, (including within the geospatial boundary, on a border of the geospatial boundary, or outside the geospatial boundary). One skilled in the relevant art will appreciate that the identified mobile device contexts are not exhaustive and that any number of additional mobile device contexts, or variations of the identified mobile communication device contexts, may also be defined for the mobile communication device 104.

With continued reference to FIG. 3, the mobile communication device 104 can also include a mobile communication device environment interface 306 for obtaining inputs corresponding to a mobile communication device environment. In an illustrative embodiment, the set of inputs can include information from one or more sensors such as a global position sensor (GPS) component or other location identification components, accelerometers, altimeters, compasses, gyroscopes, microphones, scales or other weight detection mechanisms, range finders, proximity sensors, gas or radiation detectors, electric current or electric induction detection, digital image sensors, thermometers and the like. Additionally, the set of inputs can correspond to information obtained from communication network based resource such as calendaring information, identity or contact information and the like.

In one embodiment, the set of inputs include information from sensors or information gathering components that are integrated or attached to the mobile computing device 104. In another embodiment, the set of inputs include information from external sensors or information gather components that provide the information via a communication channel, such as a hardwired connection or wireless connection (e.g., BLUETOOTH™). Still further, in another embodiment, the set of inputs include information related to sensors or processed information from another device or article of manufacture associated with the mobile communication device. For example, the set of inputs can include information from a vehicle computer indicating information about the operation/condition of the vehicle and/or environmental information. Additional information from seat sensors may be able to inform that the remote end user is indeed a passenger and not a driver, and further, that seat belts are engaged. Still further, in another embodiment, the set of inputs include information from sensors that can be repurposed, such as through additional processing, to determine mobile communication device context information. For example, image data from a camera sensor or signal data from a transceiver chipset may be utilized as inputs to a context assessment algorithm to determine mobile communication device context. The above provided identification of the specific types of sensors is not exhaustive. Accordingly, additional or alternative sensors may be utilized to provide information for determining mobile communication device context information.

One skilled in the relevant art will appreciate that the set of inputs may be selected to correspond specifically to the particular algorithms utilized to calculate mobile communication device context. In one example, microphonic sensors may used for detecting high noise levels from the embedded device microphone and using this context to permit only high importance work related calls and data session requests that pertain to the current work function. Furthermore, the mobile device context information can be utilized to inform the calling party that the callee is in a high noise environment and that a text message may be a more appropriate. In another example, the sensor information can corresponds to a determination whether a BLUETOOTH™ headset or alterative hands free device is active in accordance with a corporate policy and local jurisdiction law. In still a further example, radiation detector sensor information could be utilized to detect increases in radioactive levels. The context could be utilized to immediately instruct the call and data session management control to connect the mobile end users with an emergency response team and autonomously report existing location and radiation levels just in case the mobile end user is incapacitated by some external cause.

In still a further example, gas or substance detector sensors could be utilized to detect an increase in gas or substance levels. The context could be utilized to immediately instruct the call and data session management control to connect the mobile end users with an emergency response team and autonomously report existing location and gas and substance levels just in case the mobile end user is incapacitated by some external cause. In yet another example, utilization near field inductive techniques sensors could be utilized to detect the process of charging via near field inductive components. The context could be used such that a call and data session management entity should perhaps be reroute calls and data session requests to different devices.

In still another example, proximity sensor information could be used to determine a context that the user is currently interacting in a specific manner with the mobile end device may enable specific call and data session management decisions to be critically enabled. In a further example, image data from a mobile device camera may be utilized via signal context assessment algorithms to determine the user's environment. In another example, user configurable keys/control sensor data can be utilized to customize mobile device context information, such as using soft keys, to register specific contexts provided by the mobile communication device user (e.g., "watch me," "help," etc.).

The mobile communication device 104 can further include a mobile communication device data store 308 for storing input information from the mobile communication device environment interface 306, context information generated by the mobile communication device processing component 304 and/or the various context assessment algorithms or processes used by the mobile communication device processing component to generate the mobile communication device context information.

Communication Mitigation

As described in FIG. 1, the communication management environment can include a communication mitigation component 103. FIGS. 4-18 describe illustrative architectures, interactions, methodologies, and interfaces for facilitating communication mitigation in accordance with an aspect of the present disclosure. A more detailed example of communication mitigation is described in U.S. patent application Ser. No. 12/040,832, entitled MANAGEMENT OF MOBILE DEVICE COMMUNICATION SESSIONS TO REDUCE USER DISTRACTION, and filed Feb. 29, 2008, the entirety of which is incorporated by reference herein. However, one skilled in the relevant art will appreciate that alternative, modified or additional architectures, interactions, methodologies, and interfaces for facilitating communication mitigation are also included within the scope of the present disclosure. Accordingly, the disclosed and referenced examples are illustrative in nature and should not be construed as limiting.

Figure 5A:
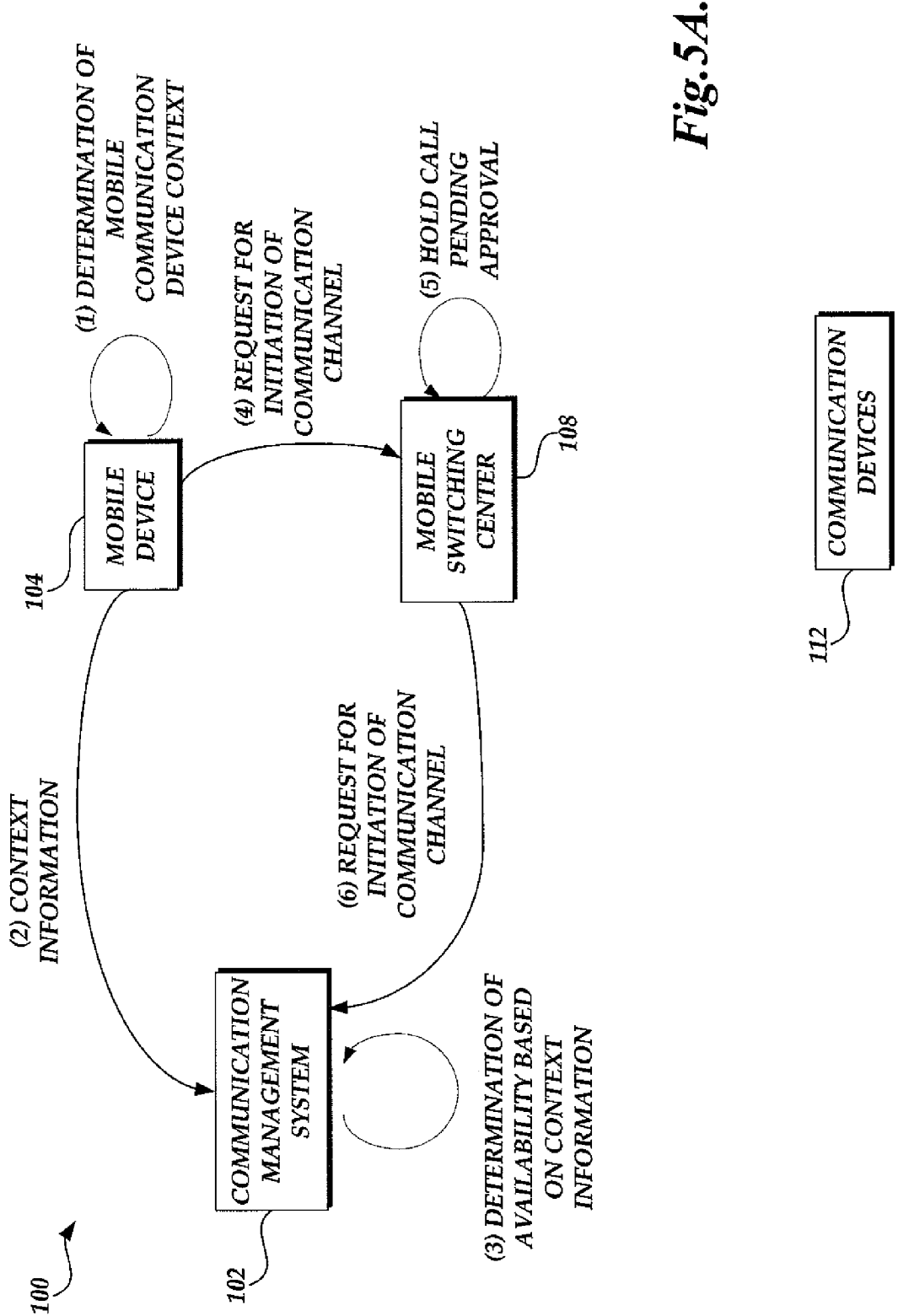
Figure 5B:
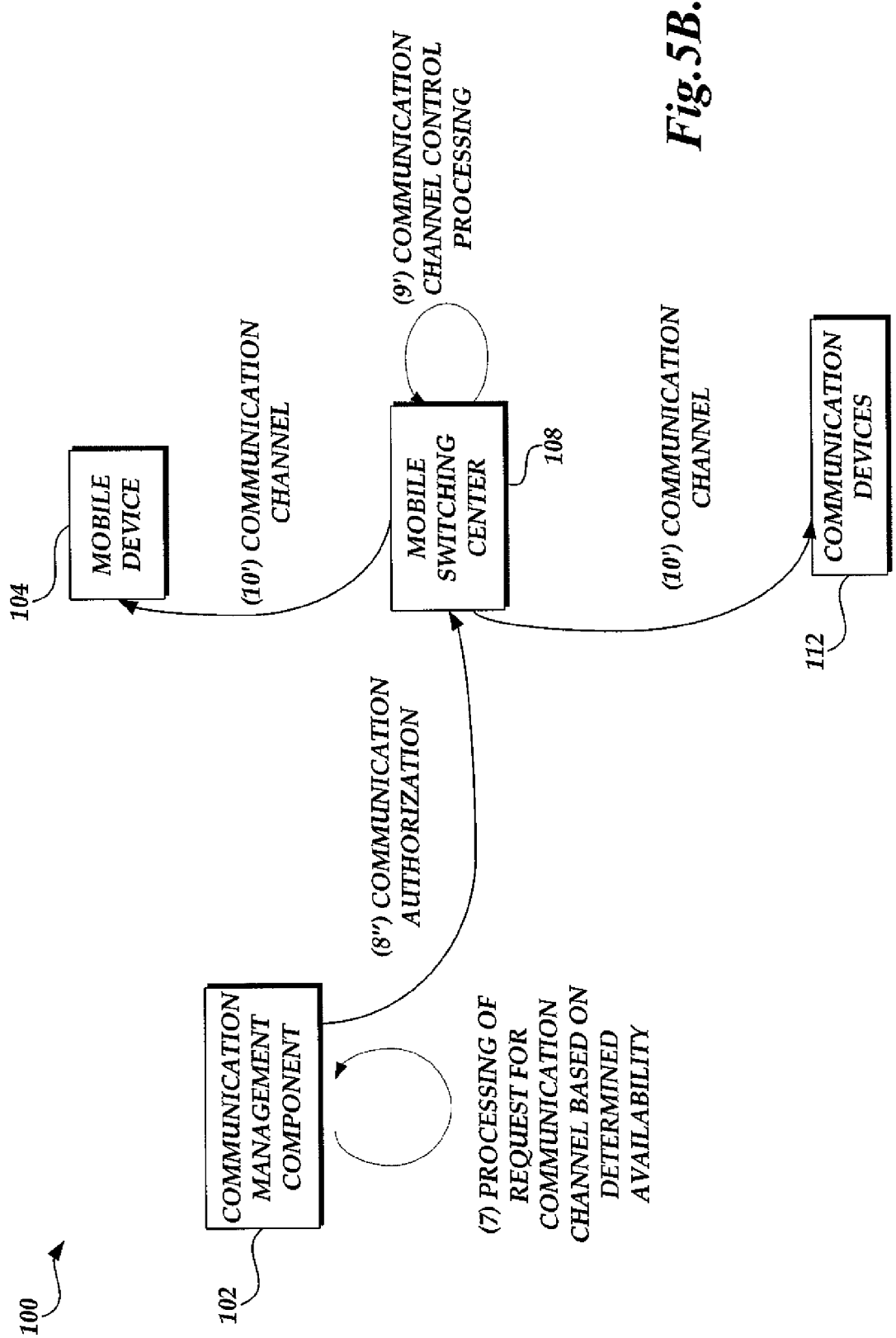
Figure 6:
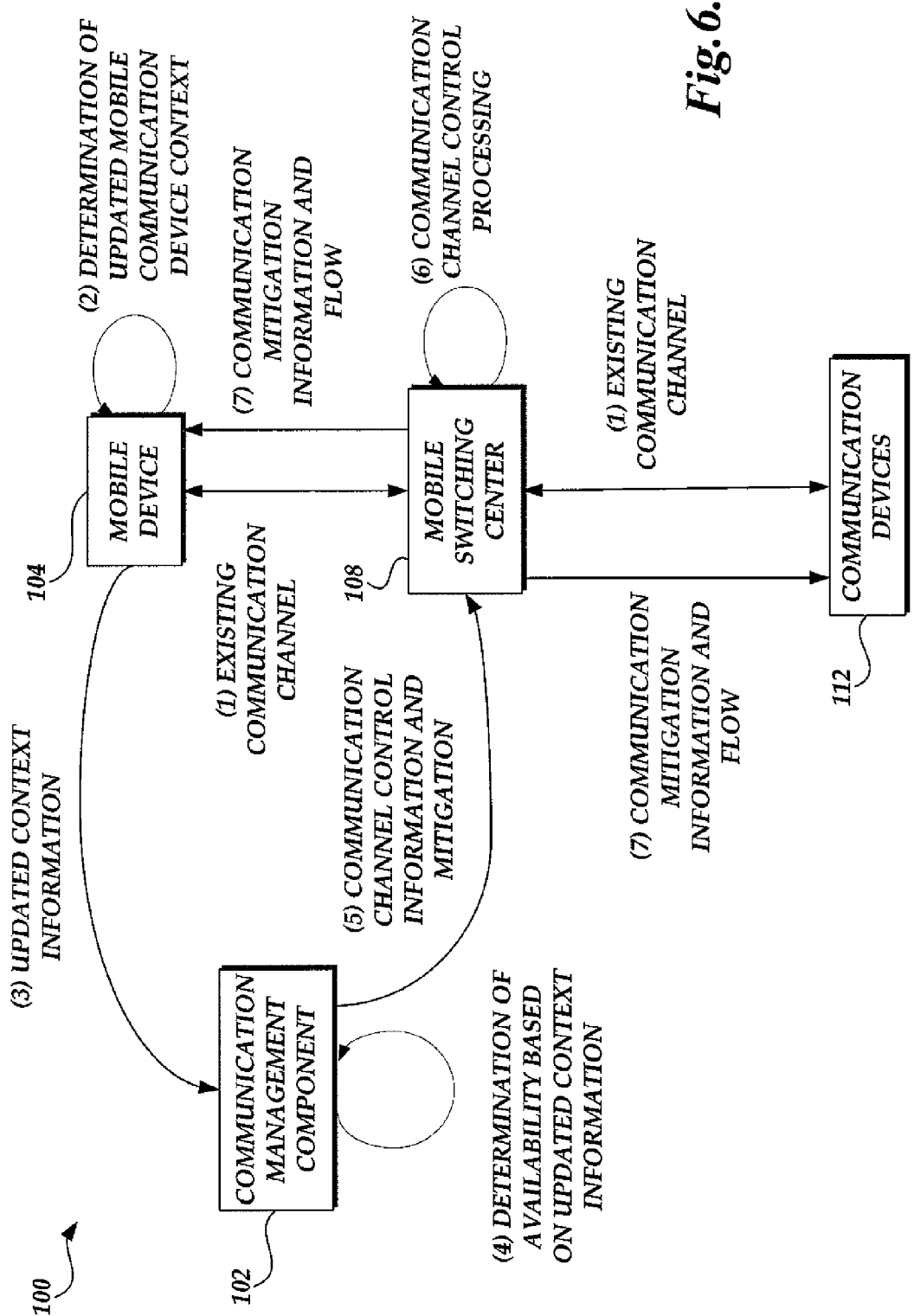
FIG. 6 is a block diagram of the communication management system of FIG. 1 illustrating the transmission of updated mobile communication device context information by a mobile communication device and the processing of an ongoing communication channel by the communication management system.

With reference now to FIG. 4-6, the interaction between various components of the communication management environment 100 of FIG. 1 will be illustrated. For purposes of the example, however, the illustration has been simplified such that many of the systems, subsystems, and components utilized to facilitate communications are not shown. One skilled in the relevant art will appreciate that such components or subcomponents can be utilized and that additional interactions would accordingly occur without departing from the spirit and scope of the present invention.

Figure 4A:
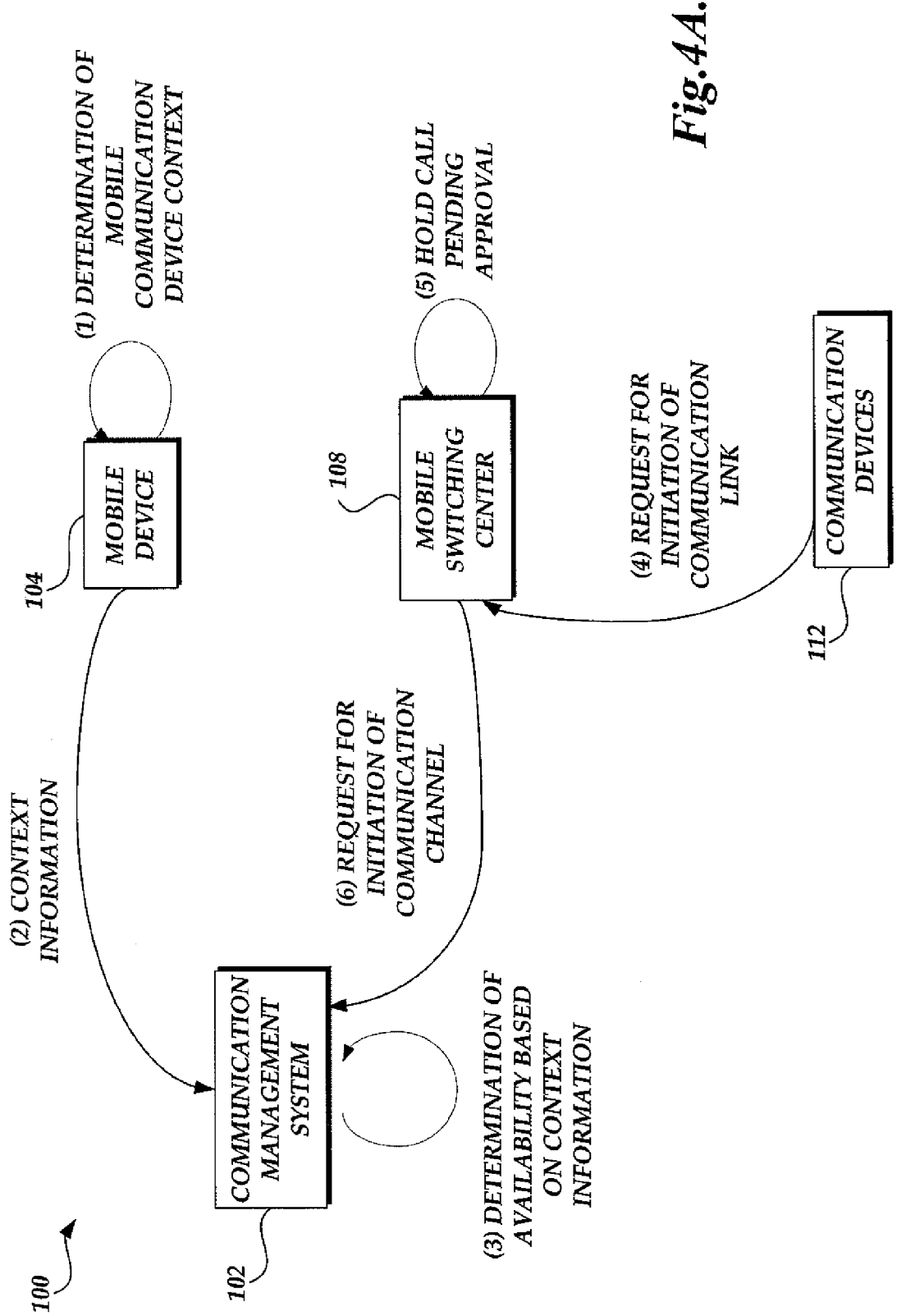
Figure 4C:
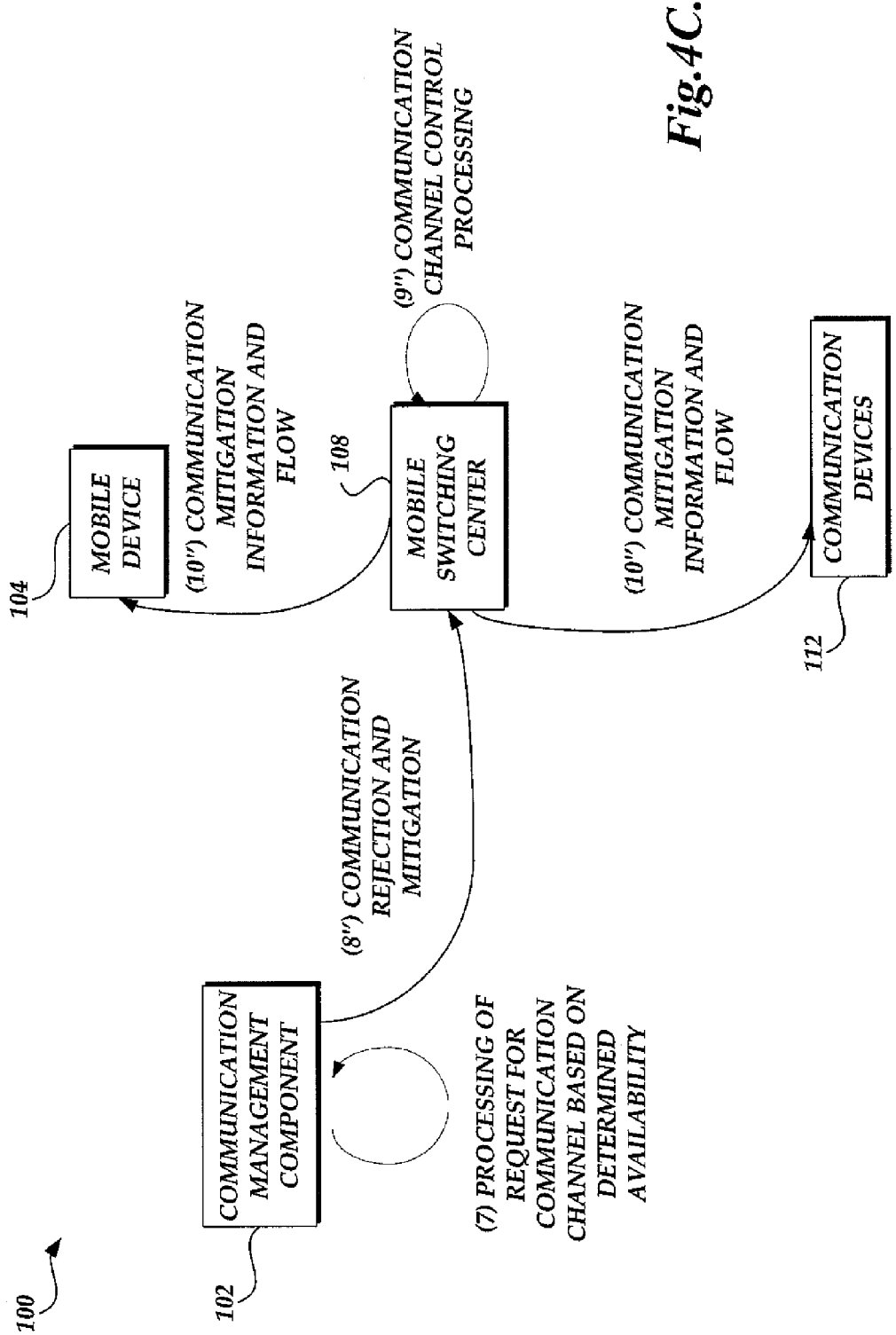

With reference now to FIGS. 4A-4C, one embodiment related to the processing of a request from a third party communication device 112 to establish a communication channel, such as an audio call, will be described. For purposes of the illustrative example, a particular mobile computing device 104 has registered with a communication management service that provides the communication management system 102. Additionally, a user of the mobile device 104 has provisioned a mobile communication device profile that identifies the availability of the mobile communication device as a function of mobile communication device contexts and third party identification information. Alternatively, some portion the mobile communication device profile may be pre-provisioned for the user and/or automatically set by an administrator, such as a service provider.

As illustrated in FIG. 4A, during the operation of the mobile communication device 104, or during an initialization of the mobile communication device, the mobile communication device interface component 306 obtains a set of inputs corresponding to the mobile communication device environment. The set of inputs are processed by the mobile communication device context processing component 304 to generate mobile communication device context information. The communication management system communication component 302 than transmits the mobile communication device context information to the communication management system 102 as appropriate. Specifically, to reduce power consumption and/or bandwidth consumption, the communication management system communication component 302 may limit the transmission of mobile communication device context information for the initialization of a mobile communication device context, a detection of a change in mobile communication device context and/or for the re-establishment of a mobile communication device context.

Upon receipt of the context information, the mobile device communication component 202 transmits the context information to the communication processing component 204 for processing. The communication processing component 204 obtains a corresponding, or applicable, mobile communication device profiles from the mobile communication device profile data store 210. The communication processing component 204 may utilize one or more mobile communication device profiles to determine mobile communication device availability from the context information. Alternatively, a single mobile communication device profile may define availability for multiple mobile communication device contexts. The communication processing component 204 then determines the availability of the mobile communication device to establish a communication channel (either receipt of a request or the initiation of a request) based on the processing.

Thereafter, in the illustrative example of FIG. 4A, a communication device 112, such as a third party communication device 112 initiates a request to establish a communication channel with the mobile device 104. The request is received by the mobile switching center 108 and is held pending an approval or rejection by the communication management system 102. The applicable mobile switching center 108 then transmits the request to the mobile service provider communication component 208 to request a determination whether the requested communication channel should be established. The request can include additional information utilized by the communication management component 102 to select an appropriate profile, including caller identification information and the like.

With reference now to FIG. 4B, upon receipt of the request or notification from the mobile switching center 108, the communication processing component utilizes the predetermined availability of the mobile communication device 104 to authorize or reject the establishment of the requested communication channel. If the request to initiate the communication channel is authorized, the authorization is transmitted to the mobile switching center 108, which processes the request for initiation of the communication channel in an appropriate manner. Accordingly, the requested communication channel is completed. As will be described in greater detail below with regard to FIG. 9, the communication management system 102 may continue to monitor the established communication channel for a change in mobile communication device context and will manage the communication channel as defined in the applicable mobile communication device profile.

With reference now to FIG. 4C, alternatively, if the request for initiation of the communication channel is rejected based on a predetermined unavailability of the mobile communication device 104, the communication management component 102 transmits a rejection authorization communication to the mobile switching center 108 to prevent the initiation of the communication channel. Additionally, the communication mitigation component 206 can provide appropriate communication mitigation, such as notifications to the users of the mobile communication device 104 and the communication device 112. Additionally, the communication management component 102 can obtain a selection of a communication channel alternative defined in the mobile communication device profile, such as voicemail systems or interactive voice response systems, as will be described in greater detail below.

With reference now to FIGS. 5A-5C, one embodiment processing of a request from a user at a mobile communication device 104 to establish a communication channel, such as an audio call, with a third party communication device 112 will be described. As described above with regard to FIGS. 4A and 4B, for the illustrative example, it is assumed that a particular mobile computing device 104 has registered with a communication management service that provides the communication management system 102 and provisioned a mobile communication device profile that identifies the availability of the mobile communication device for particular mobile communication device contexts.

As illustrated in FIG. 5A, during the operation of the mobile communication device 104, or during an initialization of the mobile communication device, the mobile communication device interface component 306 obtains a set of inputs corresponding to the mobile communication device environment. The set of inputs are processed by the mobile communication device context processing component 304 to generate mobile communication device context information. The communication management system communication component 302 then transmits the mobile communication device context information to the communication management system 102 as appropriate. Specifically, to reduce power consumption and/or bandwidth consumption, the communication management system communication component 302 may limit the transmission of mobile communication device context information for the initialization of a mobile communication device context, a detection of a change in mobile communication device context and/or for the re-establishment of a mobile communication device context.

Upon receipt of the context information, the mobile device communication component 202 transmits the context information to the communication processing component 204 for processing. The communication processing component 204 obtains one or more corresponding, or applicable, mobile communication device profiles from the mobile communication device profile data store 210. The communication processing component 204 then determines the availability of the mobile communication device to establish a communication channel (either receipt of a request or the initiation of a request) based on the processing.

Thereafter, in the illustrative example of FIG. 5A, the mobile device 104 initiates a request to establish a communication channel with a communication device 112, such as a third party communication device 112. The request is received by the mobile switching center 108 and is held pending an approval or rejection by the communication management system 102. The applicable mobile switching center 108 then transmits the request to the mobile service provider communication component 208, along with additional information, such as the identification information (e.g., telephone number) of the third party communication device 112.

With reference now to FIG. 5B, upon receipt of the request or notification from the mobile switching center 108, the communication processing component obtains applicable communication profiles using the identification information or other information and utilizes the predetermined availability of the mobile communication device 104 to authorize or reject the establishment of the communication channel. If the request to initiate the communication channel is authorized, the authorization is transmitted to the mobile switching center 108, which processes the request for initiation of the communication channel in a typical manner. Accordingly, the requested communication channel is completed. As will be described in greater detail below with regard to FIG. 9, the communication management system 102 may continue to monitor the established communication channel for a change in mobile communication device context.

With reference now to FIG. 5C, alternatively, if the request for initiation of the communication channel is rejected based on a determined unavailability of the mobile communication device 104, the communication management component 102 transmits a rejection authorization communication to the mobile switching center 108 to prevent the initiation of the communication channel. Additionally, the communication mitigation component 206 can provide appropriate notifications to the users of the mobile communication device 104 and the communication device 112. Additionally, the communication management component 102 can obtain a selection of a communication channel alternative as will be described in greater detail below.

With reference now to FIG. 6, in the event that a communication channel has been established between a mobile communication device 104 and a communication device 112, the communication management system 102 continues to determine the availability of the mobile communication device 104 to remain in the established communication channel. As illustrated in FIG. 6, the mobile communication device 104 continues to receive sensor information and determine mobile communication device context information. In the event that the mobile communication device context information has changed or is otherwise no longer valid, the communication management component 302 of the mobile device mobile transmits the updated mobile communication device context information to the communication management system 102. In one embodiment, the mobile device communication component 202 may only transmit updated context information in the event that a change in context is determined. Alternatively, the mobile device communication component 202 may transmit update context information after a predetermined time. Because the mobile device 104 has an established communication channel with the communication device 112, the communication management system communication component 302 may have to utilize a different communication channel (such as an SMS channel) to transmit the updated context information if the communication channel previously utilized to transmit the context information is being utilized for the established communication channel.

Upon receipt of the context information, the mobile device communication component 202 transmits the context information to the communication processing component 204 for processing. The communication processing component 204 obtains one or more corresponding, or applicable, mobile communication device profiles from the mobile communication device profile data store 210. The mobile communication device profile may be the same profile previously utilized to determine the availability of the mobile communication device or an additional or alternative mobile communication device profiles. As previously described, the selection of the appropriate or applicable profile stores can include the utilization of identification information, such as caller ID information. The communication processing component 204 then determines the availability of the mobile communication device to maintain the established communication channel based on the profiles. If it is determined to maintain the established communication channel, the communication management system 102 can transmit an authorization message or remain silent. Alternatively, if the communication channel should be terminated based on a determined unavailability of the mobile communication device 104, the mobile service provider communication component can transmit communication channel control information that includes a termination notification to the mobile switching center 108. Additionally, the communication mitigation component 206 can provide appropriate communication channel mitigation information, such as notifications to the users of the mobile communication device 104 and the communication device 112 and provide a selection of a communication channel alternative as will be described in greater detail below.

A. Mobile Device Context Assessment Algorithms

With reference now to FIGS. 7A-7E, an illustrative routine 1200 implemented by the mobile communication device context processing component 304 for determining context information of a mobile communication device 104 will be described. As described above, the mobile communication device context can correspond to a determination of a specific transit state indicative of a current mobile communication device environment. The availability for a communication channel may be based on the determined transit state and the appropriate mobile communication device profile. With reference to an above mentioned example, a user can provision a mobile device profile such that calls from an identified user are rerouted automatically to a voicemail system in the event that mobile device (e.g., the user) is in a city/urban transit state. As will be described, in event that the mobile communication device 104 determines it is currently in a city/urban transit state, the mobile communication device transmits the updated context information to the communication management component 102, which determines the availability/unavailability information based on the updated context information for all profiles. Thereafter, calls from the identified users are rerouted automatically without the need to poll the mobile communication device 104 until the mobile communication device provides updated context information.

Figure 7A:
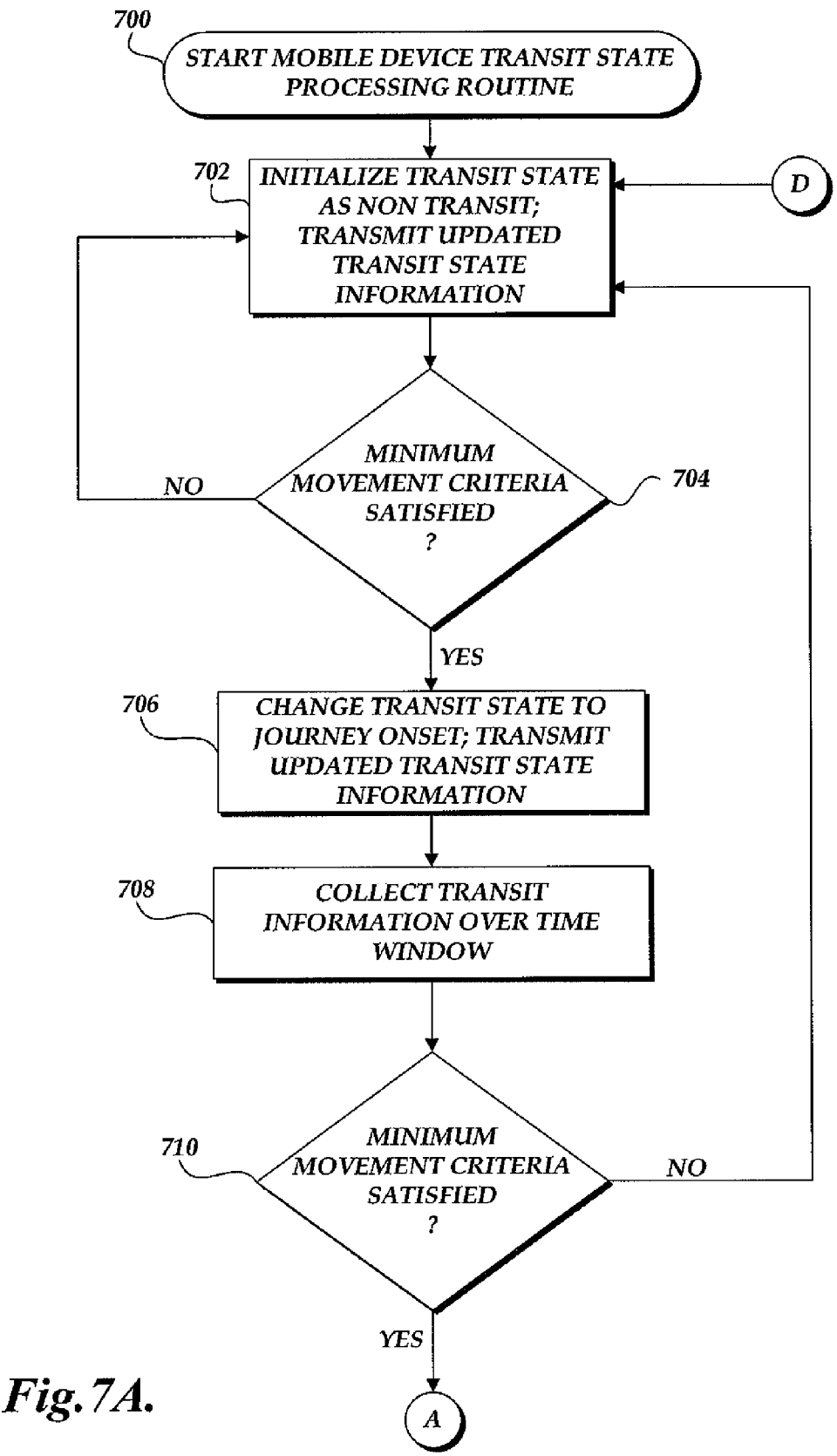
FIGS. 7A-7E are flow diagrams illustrative of travel state context assessment algorithm implemented by a mobile communication device in providing mobile communication device context information to a communication management system.

With reference now to FIG. 7A, at block 702, the routine 700 begins with the initialization of the transit state to non-transit by the mobile communication device context processing component 304. In an illustrative embodiment, the non transit state is a first state indicative of when the mobile communication device 104 is powered on or begins tracking transit state. The initialization of the transit state to non transit may be transmitted to the communication management system 102 or may be assumed as the starting context for the mobile communication device 104. At decision block 704, a test is conducted to determine whether minimum movement criteria have been satisfied based on processing the set of inputs. For example, the test can correspond to a review of velocity input(s) and distance traveled input(s) to determine whether the input values exceed a minimum threshold.

Velocity and distance information can be obtained by the mobile communication device through a variety of sensors and/or components designed to generate or calculate such information. Examples include, but are not limited to, GPS devices/components, accelerometers, navigational equipment, and the like. As previously described, the sensors and/or components may be integrated into the mobile communication device 104 or may be separate components (e.g., a car navigation system) that provide the input information via a wired or wireless connection.

In another example, the velocity and distance information may be calculated by the mobile communication device 104 through by the utilization of recognizable or detectable objects. In accordance with this example, the mobile communication device 104 receives signals generated by fixed transmitters, such as cellular communications base stations or WIFI™ wireless nodes, which generally include some identification information specific to the particular transmitter, such as an SSID for a wireless node. As a mobile communication device 104 travels, signals from specific transmitters are detected when the mobile communication device is within range of the transmitter and no longer detected when the mobile communication device is beyond the range of the transmitter. For known communication ranges of transmitters, such as WIFI™ wireless nodes, velocity and distance traveled information may be calculated based on monitoring time from the detection of a signal from a transmitter to loss of the signal. Additionally, the detection of the signal from the transmitter would not require registration with the transmitter and could still be practiced with transmitters that restrict access, such as through encrypted transmissions.

If the minimum movement criteria have not been satisfied, it is assumed that the mobile communication device (considering its environment) is still in a non-transit state and the routine 700 returns to block 702. The routine 700 may continue to loop through this portion for any amount of time.

Alternatively, if the minimum movement criteria have been satisfied, it is assumed that the mobile communication device 104 (considering its environment) is in motion, and at block 706, the transit state is changed to a "journey onset state." Because the transit state has changed, the mobile communication device 104 may transmit updated context information to the communication management component 102 indicative of the change in transit state to a journey onset state. At block 708, the mobile communication device context processing component 304 enters an observation window for collecting the various inputs over a period of time. The observation window can be configured such that the mobile communication device 104 collects a fixed number of sets as defined by an information collection interval over a time period. Each time a set of inputs is collected a counter is decremented and the process continues until the targeted number of sets on inputs have been collected (e.g., the counter is decremented to a value of "0"). Additionally, if the mobile communication device environment interface 306 is currently not receiving inputs, or otherwise not accepting inputs, the mobile communication device 104 may enter a lower power consumption mode in which one or more components of the mobile communication device 104 become inactive or enter in a low power consumption mode of operation. In turn, the mobile communication device 104 then powers up, or wakes up, at the next information collection interval. The specific information collection interval implemented by the mobile communication device context processing component 304 may be dependent on the granularity of the sensor information, the amount of input information that should be collected for a given transit state, and/or the likelihood of a potential change in transit state. For example, a longer collection interval can be set for transit states in which variations in the set of inputs is not expected (e.g. a highway transit state) to further conserve mobile communication device power.

Upon the expiration of the time window, at decision block 710, a test is conducted to determine whether minimum movement criteria have been satisfied based on processing the set on inputs. If the minimum movement criteria have not been satisfied, the mobile communication device 104 is determined to be no longer in motion and the routine 700 returns to block 702 to a "non transit" travel state (described above). Because the transit state has changed, the mobile communication device 104 may transmit updated context information to the communication management component 102 indicative of the change in transit state back to a non transit state.

Figure 7B:
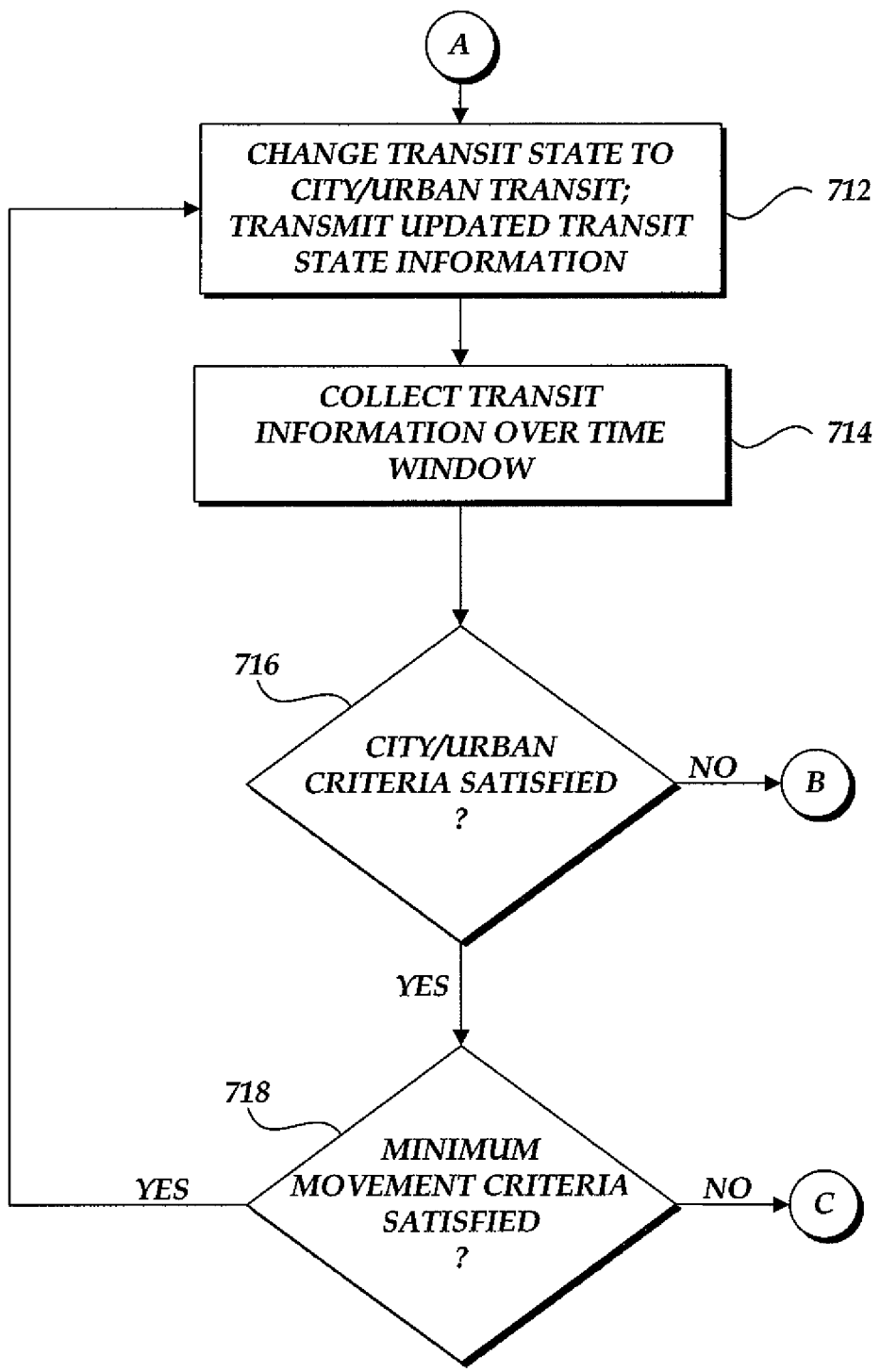

With reference now to FIG. 7B, alternatively, if at decision block 710 (FIG. 7A), the minimum movement criteria have been satisfied, at block 712, the mobile communication device 104 is determined to be in motion and the transit state is changed to a "city/urban" transit state. In an illustrative embodiment, the city/urban transit state can correspond to the driving conditions experienced in city or urban areas in which there are frequent stops and wide changes in velocity. Again, because the transit state has changed, the mobile communication device 104 may transmit updated context information to the communication management component 102 indicative of the change in transit state back to a non transit state. At block 714, the mobile communication device context processing component 304 enters an observation window that defines a set of intervals for collecting multiple sets of inputs over a period of time. In a city/urban transmit state, the collection interval for receiving each set of inputs may be configured to be shorter because of the potential for greater variances in the information from set of inputs.

At decision blocks 716-718, the mobile communication device context processing component 304 processes the collected input data to determine whether the mobile communication device 104 should remain in its current city/urban transit state, whether the mobile communication device has reached a terminus state, or whether the transit state is more indicative of another transit state typically indicative of highway travel. The collected information can include velocity, bearing, and distance traveled information. Additionally, the collected information can include processed velocity, bearing and distance traveled information, referred to as variance information, that indicate variances and/or rates of variance in the velocity, bearing and distance traveled over each of the collection intervals in the observed time window.

Figure 7C:
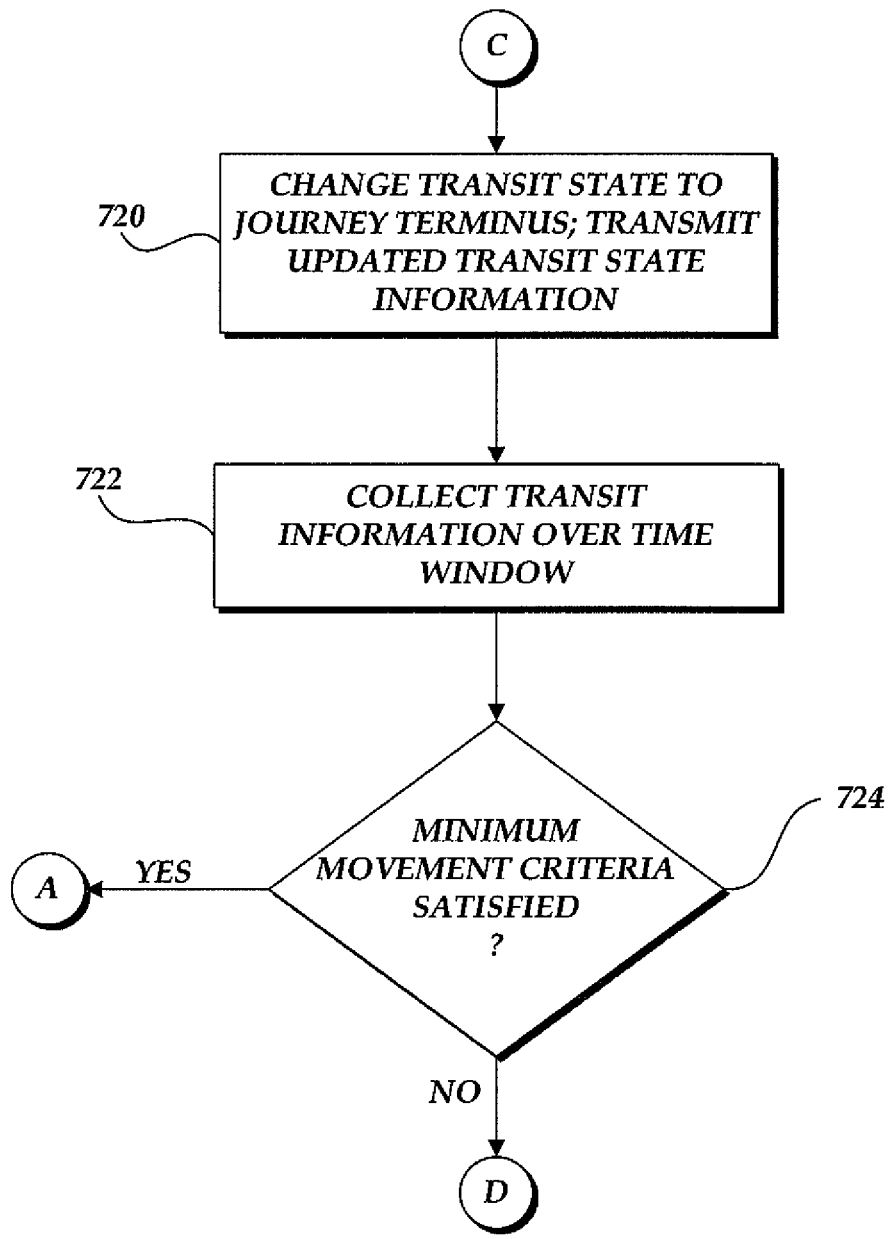

At decision block 716, a test is conducted to determine criteria indicative of city/urban transit state have been satisfied. The criteria indicative of city/urban transit state can correspond to consideration of variance thresholds for velocity, distance traveled and bearing that are indicative of patterns of city/urban travel. For example, velocity variances for a city/urban transit state may be indicative of a collection of inputs at a time in which a vehicle is stopped (e.g., at a street light) and another collection when the vehicle is traveling at a higher velocity. The thresholds may be determined by observed driving behavior, set by an administrator or set by a particular user. If the criteria indicative of city/urban transit state have not been satisfied, the mobile communication device context processing component 304 determines that the mobile communication device 104 is not likely in a city/urban driving embodiment and moves to block 726, which will be described in greater detail below. Alternatively, if the criteria indicative of city/urban transit state have been satisfied, the mobile communication device context processing component 304 determines that the mobile communication device 104 should either remain in a city/urban travel state or has reached a terminus. Accordingly, at decision block 718, a test is conducted to determine whether minimum movement criteria have been satisfied based on processing the set on inputs. If the minimum movement criteria have not been satisfied, the mobile communication device 104 is determined to be no longer in motion and the routine 700 proceeds to block 720 (FIG. 7C). Alternatively, if the minimum movement criteria have been satisfied, the routine 700 returns to block 712. In this instance, however, the mobile communication device 104 does not need to transmit context information to the communication management component 102 because the transit state has not changed.

With reference now to FIG. 7C, at block 720, the transit state of the mobile communication device is changed to a "journey terminus" transit state. In an illustrative embodiment, the journey terminus transit state can correspond to the completion of the initial travel. As previously described, because the transit state has changed, the mobile communication device 104 may transmit updated context information to the communication management component 102 indicative of the change in transit state. At block 722, the mobile communication device context processing component 304 enters an observation window in which a collection interval may be set to a shorter time period because of the expectation for a higher variance between the sets of inputs at each collection interval.

Upon the completion of the observation window, the mobile communication device context processing component 304 will determine whether the mobile communication device has re-entered a travel state (e.g., after a temporary stop) or has entered a non-transitory state (e.g., at home or at the office). Accordingly, at decision block 724, a test is conducted to determine whether a minimum movement has been detected based on the set on inputs. If minimum movement has not been detected, the mobile communication device 104 is determined to be no longer in motion. Accordingly, the transit state is changed to "non transitory" at block 702 (FIG. 7A). Alternatively, if a minimum movement has been detected based on the set of inputs, the mobile communication device 104 is determined to be in transit again and the routine 700 proceed to block 712 (FIG. 7B) in which the transit state is changed to city/urban transit state. In both decision alternatives, the mobile communication device 104 transmits updated context information to the communication management component 102 indicative of the change in transit state.

Figure 7D:
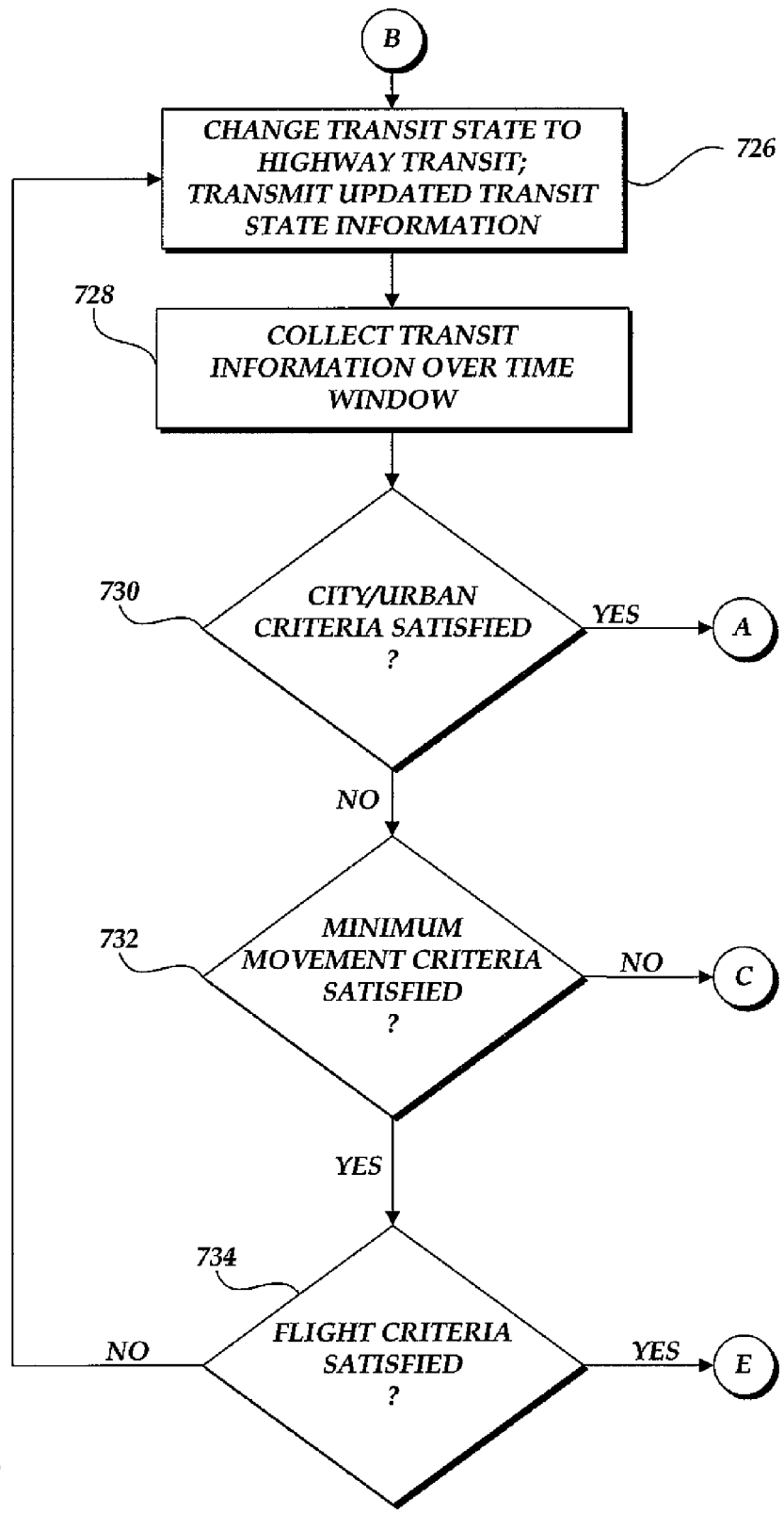

With reference now to FIG. 7D, if at decision block 716 (FIG. 7B), the criteria indicative of city/urban transit state were not satisfied, the mobile communication device context processing component 304 determines that the mobile communication device is a highway transit state, indicative of highway travel. Accordingly, at block 726, the transit state is changed to a "highway" traveled state and the mobile communication device 104 transmits updated context information to the communication management component 102 indicative of the change in transit state. At block 728, the mobile communication device context processing component 304 enters an observation window in which a collection interval may be set to a longer time period because of the expectation for a lower variance between the sets of inputs at each collection interval. When the mobile communication device 104 is a highway transit state, it can transition to a terminus state (e.g., indicative of a completion of travel), revert back to a city/urban transit state or remain in a highway transit state. Additionally, in an optional embodiment, the mobile communication device context processing component 304 can determine that the mobile communication device 104 is a flight state indicative of airplane travel. Accordingly, as will be illustrated in FIG. 7D, the mobile communication device context processing component 304 can also reach an "in flight" transit state from the highway traveled state. In all the decision alternatives involving a change in transition state, the mobile communication device 104 transmits updated context information to the communication management component 102 indicative of the change in transit state.

At decision block 730, a test is conducted to again determine whether criteria indicative of city/urban transit state has been satisfied. If the city criteria indicative of city/urban transit state has been satisfied, the mobile communication device context processing component 304 determines that the mobile communication device 104 should revert back to a city/urban travel state and the routine 700 returns to block 712 (FIG. 7B). Alternatively, if the criteria indicative of city/urban transit state has not been satisfied, the mobile communication device context processing component 304 determines that the mobile communication device 104 should either remain in the highway transit state, move to a journey terminus state, or move to an in flight state. Accordingly, at decision block 732, a test is conducted to determine whether a minimum movement has been detected based on the set on inputs. If the minimum movement has not been detected based on the set on inputs, the mobile communication device 104 is determined to be no longer in motion and the routine 700 proceeds to block 720 (FIG. 7C).

If, however, at decision block 732, the minimum movement has been detected based on the set on inputs, at decision block 734, a test is then conducted to determine whether criteria indicative of an in-flight transit state has been satisfied. In an illustrative embodiment, criteria indicative of an in-flight transit state can correspond to consideration of variance thresholds for velocity, distance traveled and bearing that are indicative of patterns of air travel. The criteria may also include consideration of information from altimeters or the like. The thresholds may be determined by observed driving behavior, set by an administrator or set by a particular user. If the criteria indicative of an in-flight transit state has not been satisfied, the mobile communication device context processing component 304 determines that the mobile communication device should remain in a highway transit state and the routine 700 returns to block 726.

Figure 7E:
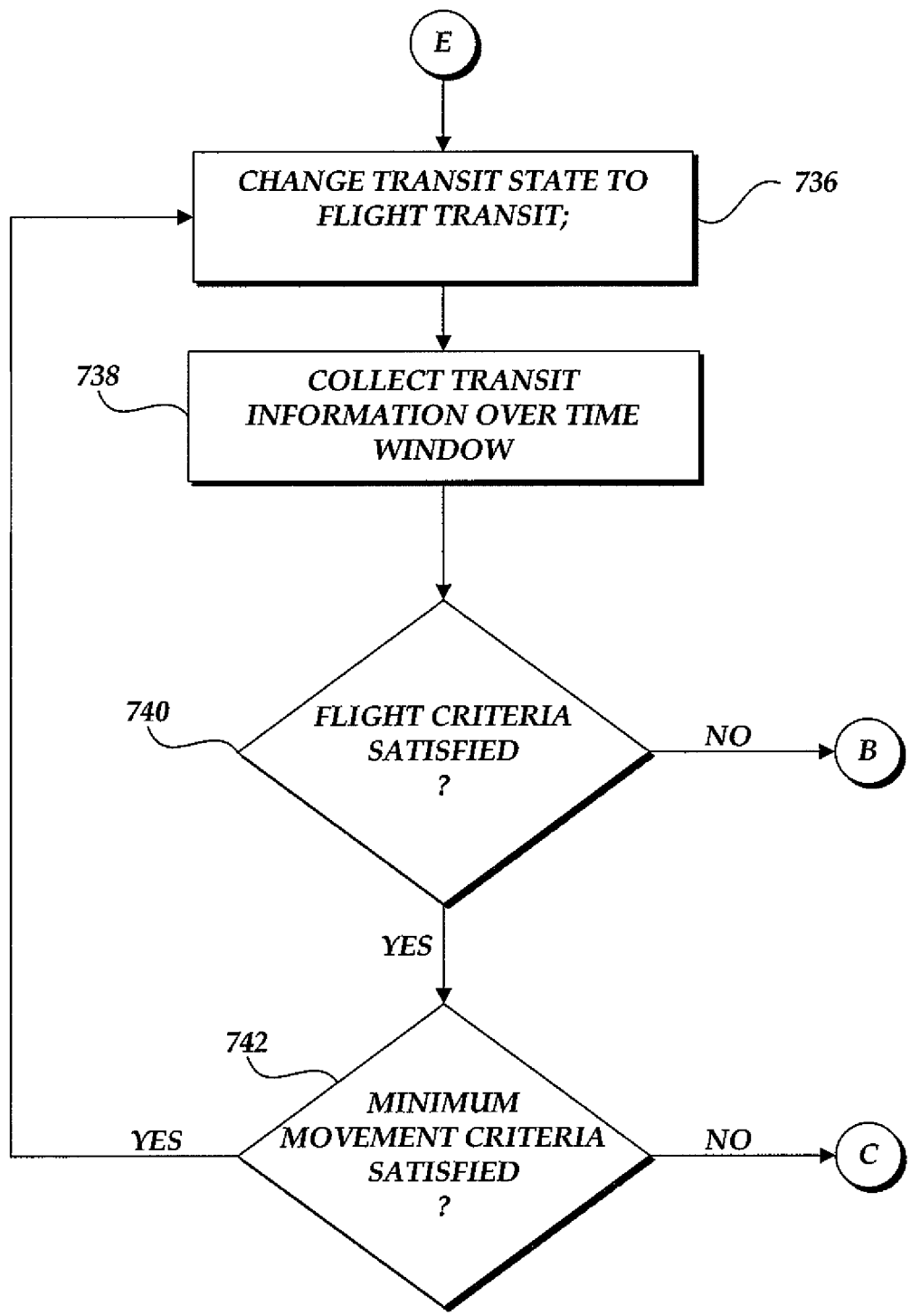

With reference now to FIG. 7E, if the criteria indicative of an in-flight transit state has been satisfied, the mobile communication device context processing component 304 determines that the mobile communication device is in flight. Accordingly, at block 736, the transit state is changed to an "in flight" transit state. At block 738, the mobile communication device context processing component 304 enters an observation window for collecting the various inputs over a period of time, which may be a longer time period. At decision block 730, a test is conducted to determine whether is conducted to determine whether one or more in flight distance variances have been exceeded. If the criteria indicative of an in-flight transit state has not been satisfied, the mobile communication device context processing component 304 determines that the mobile communication device 104 should revert back to a highway travel state and the routine 700 returns to block 726 (FIG. 7D). Alternatively, if the criteria indicative of an in-flight transit state has been satisfied, the mobile communication device context processing component 304 determines that the mobile communication device 104 should either remain in the in flight distance transit state or move to a journey terminus state. Accordingly, at decision block 740, a test is conducted to determine whether a minimum movement has been detected based on the set on inputs. If the minimum movement has not been detected based on the set on inputs, the mobile communication device 104 is determined to be no longer in motion and the routine 700 proceeds to block 720 (FIG. 7C). Alternatively, if minimum movement has been detected based on the set of inputs, the routine 700 remains in an in-flight transit state and the routine 700 returns to block 736. In all the decision alternatives involving a change in transition state, the mobile communication device 104 transmits updated context information to the communication management component 102 indicative of the change in transit state.

Figure 8:
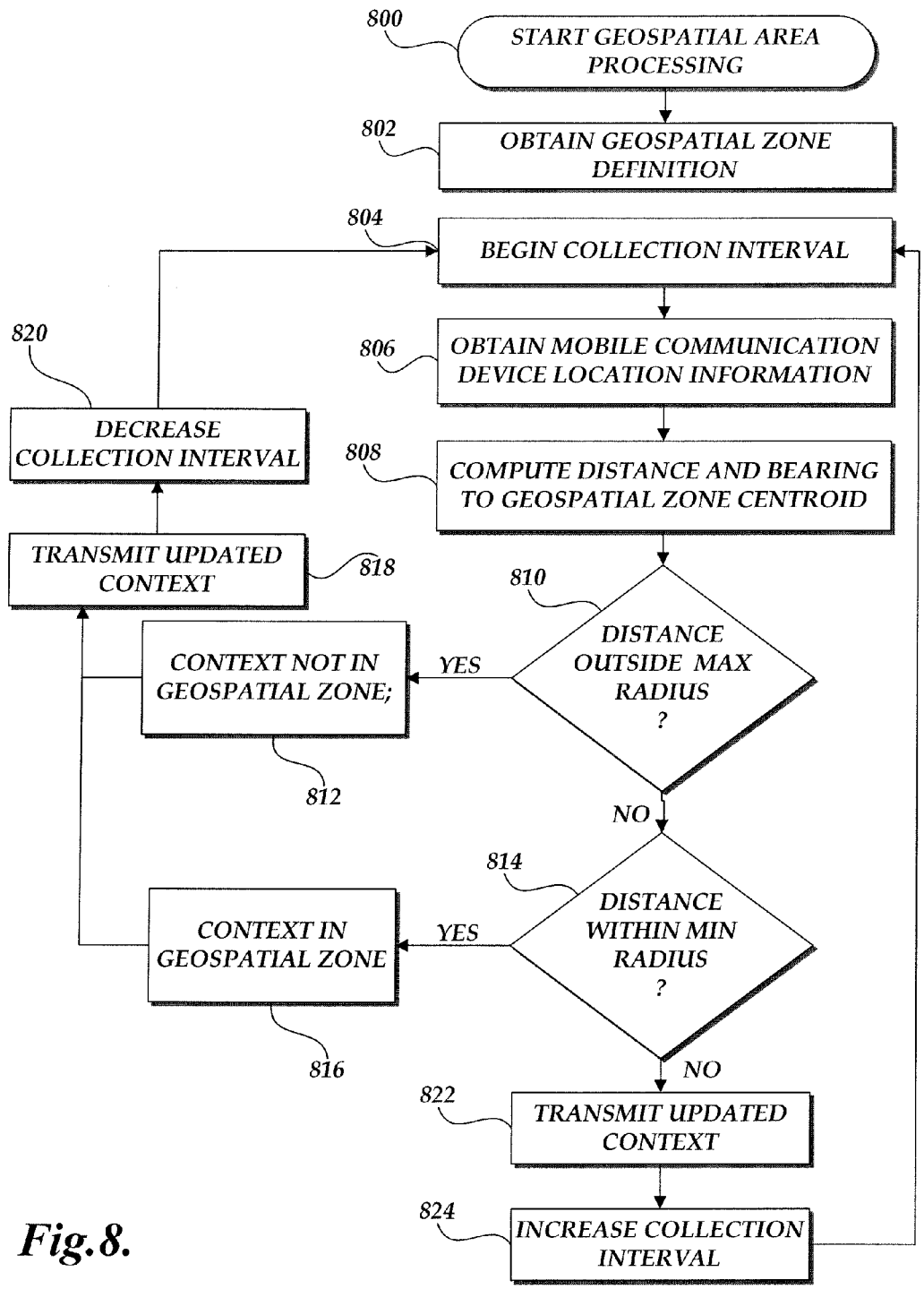
FIG. 8 is a flow diagram illustrative of a geospatial context assessment algorithm implemented by a mobile communication device in providing mobile communication context information to a communication management system.

With reference now to FIG. 8, a routine 800 implemented by the mobile communication device context processing component 304 for determining mobile communication device geospatial context information will be described. In an illustrative embodiment, geospatial information may be defined for a geographic region. The geospatial information can include a centroid, which corresponds to an approximation of the geospatial region's central position. The centroid can be defined in terms of a longitude and latitude, x and y coordinates in a grid-type layout or other position coordinates. The geospatial information can also include a minimum radius distance that corresponds to a minimum radius that is within all boundaries of the geospatial region. The geospatial information can further include a maximum radius that corresponds to a maximum radius that is beyond all boundaries of the geospatial region. One skilled in the relevant art will appreciate that the contours of boundaries of a geospatial region can be defined in terms of a radius distance plus bearing from the centroid.

With reference to FIG. 8, at block 802, the mobile communication device context processing component 304 obtains the geospatial region definitions from the mobile communication device context data store 308. The geospatial region definitions may be stored and maintained in a variety of formats and storage media. Additionally, the geospatial region definitions may be prioritized in terms of order of processing by the mobile communication device 104. At block 804, the mobile communication device environment interface 306 begins a collection window in which a geospatial zone definition is evaluated to determine whether the mobile communication device 104 is within the zone. As described above with regard to transit state context assessment algorithms, the observation window can be configured such that the mobile communication device 104 collects a fixed number of sets as defined by an information collection interval over a time period. Each time a set of inputs is collected a counter is decremented and the process continues until the targeted number of sets on inputs have been collected (e.g., the counter is decremented to a value of "0"). Additionally, if the mobile communication device environment interface 306 is currently not receiving inputs, or otherwise not accepting inputs, the mobile communication device 104 may enter a lower power consumption mode in which one or more components of the mobile communication device 104 become inactive or enter in a low power consumption mode of operation. In turn, the mobile communication device 104 then powers up, or wakes up, at the next information collection interval. The specific information collection interval implemented by the mobile communication device context processing component 304 may be dependent on the granularity of the sensor information, the amount of input information that should be collected for a given transit state, and/or the likelihood of a potential change in transit state. For example, a longer collection interval can be set for transit states in which variations in the set of inputs is not expected to further conserve mobile communication device power.

At block 806, the mobile communication device context processing component 304 obtains mobile communication location information. In an illustrative embodiment, the mobile communication device environment interface 306 can obtain various sensor information indicative of a location or relative location of the mobile communication device. For example, the mobile communication device environment interface 306 can obtain GPS information from an attached GPS component or via wireless communication from another GPS component. In another example, the mobile communication device environment interface 306 can interface with a vehicle's navigation system to obtain location information. In still another example, the mobile communication device environment interface 306 can interface with wireless communication equipment, such as cellular base stations, wireless network nodes (e.g., WIFI™ and WiMax network nodes), and obtain location information. Additionally, the sensor information can include accelerometers and compass information that facilitates a bearing or direction of the mobile communication device.

Figure 9:
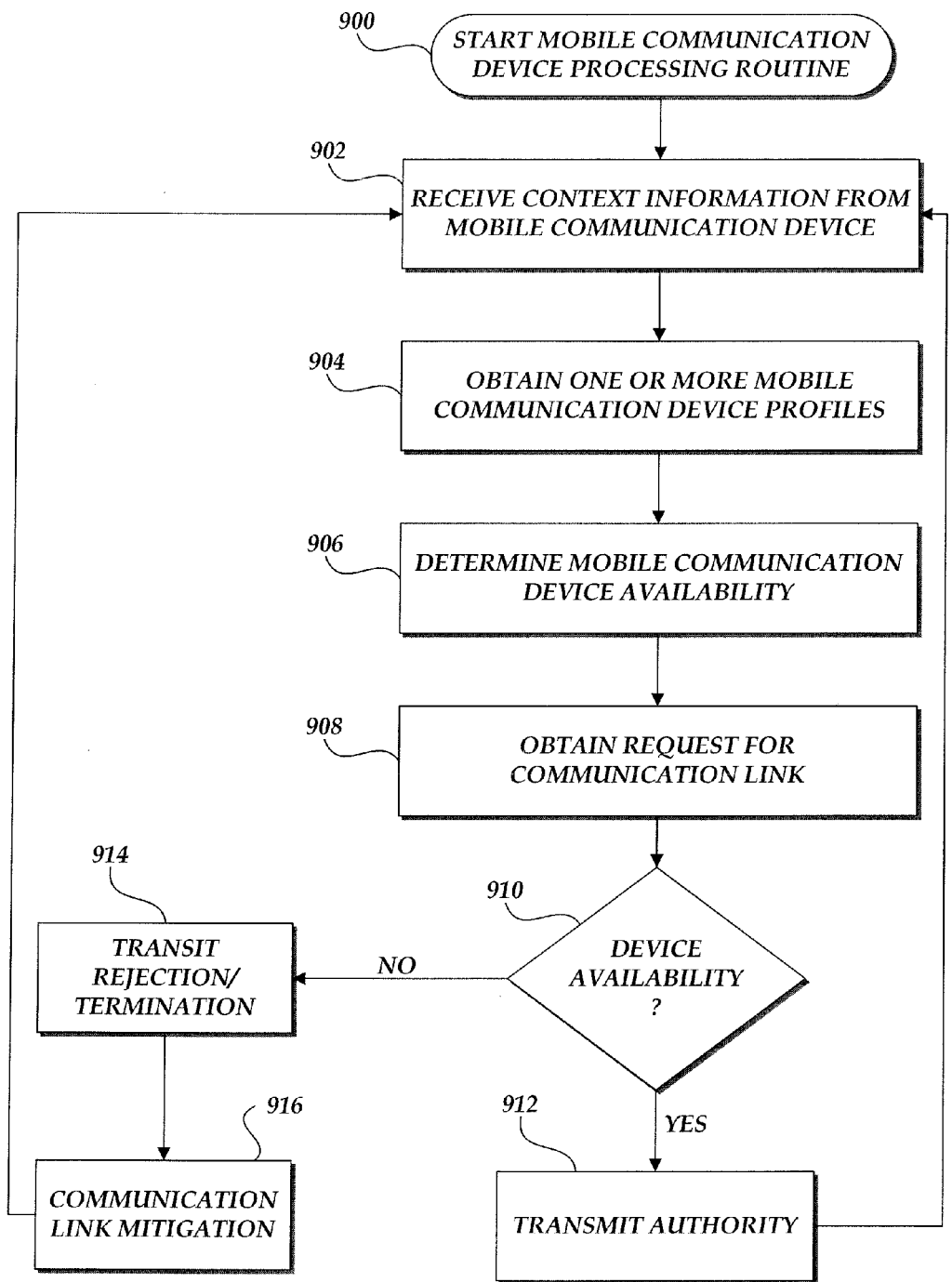
FIG. 9 is a flow diagram illustrative of a communication management routine implemented by a communication management system for managing communications according to mobile communication device context information.

In an additional embodiment, and as illustrated in FIG. 9, the mobile communication device environment interface 306 can associate location meta data with known signals from wireless transmitters such that a detection of a signal can provide an indication to the mobile communication device environment interface 306 of the relative location of a mobile communication device 104. As explained above with regard to FIG. 7, as a mobile communication device 104 travels, signals from specific transmitters are detected when the mobile communication device is within range of the transmitter and no longer detected when the mobile communication device is beyond the range of the transmitter. In embodiments in which the mobile device detects signals from the same wireless transmitters, the mobile communication device environment interface 306 can associate location meta data obtained from another location source (such as a GPS component) to the information indicative of the wireless transmitter, such as a WIFI™ SSID. Accordingly, in conjunction with the known range of the wireless transmitter, the mobile communication device environment interface 306 can estimate range, associate the location meta data as the approximate location of the mobile communication device 104 for purposes of evaluating context according geospatial zones.

For purposes of power consumption, the mobile communication device environment interface 306 can monitor various location sensors/inputs. The mobile communication device environment interface 306 can prioritize or rank the location information sources based on various factors, including degree of confidence in the accuracy of the location information, power consumption associated with collecting the location data, financial or service contract issues, and the like. For example, assume that a mobile communication device environment interface 306 has previously stored location information for a known WIFI™ wireless node in Meta data in the manner described above. Although location information may also be available for an attached GPS component, operation of the GPS component consumes much more device power. Accordingly, the mobile communication device environment interface 306 could choose to receive/use location information from a source with the least power consumption metrics.

With reference again to FIG. 8, at block 808, the mobile communication device context processing component 304 calculates the distance and bearing of the current location of the mobile device to the centroid of geospatial zone. At decision block 810, a test is conducted to determine whether the distance to the centroid is outside of the maximum radius defined for the geospatial zone. If so, at block 812, the mobile device's current context is outside the geospatial zone. The routine 800 then proceeds to block 818, which will be described below.

If at decision block 810, the distance to the centroid is not outside the maximum radius, the mobile communication device context processing component 304 will then determine whether the mobile communication device is clearly within the geospatial zone or on the fringe of boundary of the geospatial zone. At decision block 814, a test is conducted to determine whether the distance is less than the minimum radius defined for the geospatial zone. If so, at block 816, the mobile device's current context is inside the geospatial zone. The routine 800 then proceeds to block 818.

At block 818, the mobile communication device 104 must transmit updated context information if a context state has changed. Accordingly, if the mobile communication device has not changed from outside the geospatial zone (block 812) or within the geospatial zone (block 816), no update will be provided. At block 820, the interval for collection of location information and the evaluation of the proximity to the geospatial zone will be decreased (or verified to be at a lower level). In either the case of clearly outside the geospatial zone or clearly within the geospatial zone, the likelihood of a sudden change in context decreases. For example, for a geospatial zone corresponding to an entire city, the frequency in which the mobile device would detect a change corresponding to being detected outside the citywide geospatial zone would likely be low. Accordingly, the collection interval could be adjusted in an effort to mitigate power drain associated with the collection and processing of the sensor information. The routine 800 then returns to block 804 for continued collection and processing of the information at the next collection interval.

Turning again to decision block 814, if the distance is not less than the minimum radius defined for the geospatial zone, the mobile communication device 104 is likely just within the boundary of the geospatial zone or just outside the boundary of the geospatial zone. Accordingly, the mobile communication device context processing component 304 can then determine with the mobile communication device 104 falls within or just without. If the determined context is a change from a previous context, at block 822, the updated context information is transmitted to the communication management component 102. At block 824, the collection interval is increased (or verified to be at a higher level). In the case of neither clearly outside the geospatial zone or clearly within the geospatial zone, the likelihood of a sudden change in context increases. Because of the potential for more likely changes in context, the interval for collection is increased. The routine 800 then returns to block 804 for continued collection and processing of the information at the next collection interval.

B. Communications Management Component Operation

With reference now to FIG. 9, a routine 900 implemented by the communication processing component 204 to manage communications associated with a mobile communication device 104 will be described. At block 902, the mobile communication device interface component 202 receives mobile communication device context information from the mobile communication device 104. The mobile communication device context information corresponds to processed inputs and is indicative of the mobile communication device context. The context information may require additional processing by the communication management system 102. As previously discussed, the mobile device communication component 202 may utilize any number of communication channels to receive the context information from the mobile communication device 104. Additionally, in the event that the context information corresponds to updated context information, especially if the mobile communication device is presently in an established communication channel, the mobile device communication component 202 may utilize alternative communication channels.

At block 904, the communication processing component 204 obtains mobile communication device profile information from the mobile communication device profile store 210. The mobile communication profile data store 210 can correspond to a database that identifies different mobile communication device profiles according to different mobile communication device context. For example, a mobile communication device may have a profile for each defined geospatial region and transit state. In this illustrative embodiment, the profile defines the availability for communication channels for all incoming communication channel requests. In an alternative embodiment, the mobile communication device profile data store may maintain additional or supplemental profiles that define availability for various mobile communication device contexts according to particular or identifiable users or groups of users. In this embodiment, the profile information can correspond to a routing table that identifies availability according to context information with an identifiable user.

At block 906, the communication processing component 204 determines the communication channel availability according to the profile information obtained at block 904. The availability information may be determined upon receipt of the context information and/or may be updated upon receipt of updated context information. Additionally, if a communication channel is not already established, the availability is determined prior to receiving a request for establishing a communication channel from either the mobile communication device 104 or a third party communication device 112. Still further, the communication management component 102 can also receive additional information from additional third party information sources for processing the profile to determine availability. For example, the communication management system can interface with network resources, such as calendaring applications or interfaces, to receive user calendaring information for an identified period of time. In this example, the calendaring information may be applied to a profile indicating communication channel availability based on categories of appointments (e.g., unavailability for a communication channel based on meetings with a "High Priority" label). Additionally, the calendaring information may be utilized by the communication management system in the selection of communication mitigation options.

At block 908, the mobile service provider communication component 208 obtains a notification of a request to establish a communication channel. The notification can include a request to provide authorization for establishing the requested communication channel. Alternatively, the notification can include an indication that the communication channel will be initiated by default unless the communication management system 102 provides an indication that the communication channel should not be established. Additionally, the request to initiate the communication can include additional information regarding the identity or properties of the other party to the requested communication channel and that can be utilized to determine establish appointments for the user of the mobile device.

Returning to FIG. 9, at decision block 910, the communication processing component 204 performs a test to determine whether the mobile communication device is available. In an illustrative embodiment, if the communication processing component 204 has utilized a profile that is applicable to all users, the device availability may be quickly determined based on the prior processing. If, however, the mobile communication device profiles specifies availability based on the identity of some third parties, the communication processing component 204 looks up the specific availability of the user or groups of users.

To facilitate the processing of availability information according to an identified user or groups of users, the communication processing component 204 can utilize a fast lookup routing table that sorts availability by the user's identity, such as phone number or IP address. In this embodiment, the data is sorted by number. As the communication processing component 204 selects a first identifier in the identity, such as the first digit of the phone number, any entries in the table not having the matching numbers collapse. This process would continue for each additional digit that is provided. One skilled in the relevant art will appreciate that individual users may be represented by full identities. Additionally, the routing table may also limit the number of identifiers (e.g., digits) as necessary to distinguish one user from another. For example, if the routing table has four users that have a matching area code and that have different third digits in their phone numbers, the routine table may limit entries to the area code and the first three digits and need not enter the entire area code. Likewise, for groups of users (such as an office), the entries for the entire group may be limited to the identifying information from the organization (such as the first set of digits from an IP address).

With continuing reference to FIG. 9, if the mobile communication device 104 has been determined to be available, at block 912, the mobile service provider communication component 208 transmits an authorization to the mobile switching center 108. In the event that the routine 900 is being implemented for an existing communication channel, block 912, may be omitted. The routine 900 returns to block 902.

Alternatively, if it has been determined that mobile communication device 104 is not available, at block 914, the mobile service provider communication component 208 transmits a rejection or termination message to the mobile switching center 108. In an illustrative embodiment, the rejection notice may have an immediate effect that prevents the establishment of a communication channel. In another embodiment, the termination notice may include a time to allow for a time period of continued communication prior to termination. The communication processing component 204 may select the time period according to the context information and the immediacy of the determined need for termination. At block 916, the communication processing component 206 processes the communication mitigation and the routine 900 returns to block 902.

C. Communication Mitigation

In an illustrative embodiment, the communication mitigation for a rejected or terminated communication channel can be specified in a mobile communication device profile. As discussed above, the profile may be described with regard to all users, groups of users and/or specific users. In an illustrative embodiment, the communication mitigations can include immediate alternative communication channels/methods, such as a redirection to a voicemail system, a text to speech message processing system, the launching of an SMS service or email service, a redirection to an identified backup caller (such as an operator or an assistant), and the like.

In another embodiment, the communication mitigation corresponds to delayed mitigation techniques that reestablish the requested or existing communication channel upon a determined availability. For example, the user of the mobile device 104 or the third party communication device 112 can request a callback or new communication channel upon a change of mobile device context that results in the availability of the mobile communication device. The request can include a time component or other information for specifying the expiration of the request or availability for the requested callback. Additionally, the request can include additional information such as calendaring information for scheduling the requested communication channel. Additionally, the calendaring information may be utilized to select which communication mitigation technique may be available.

In still a further embodiment, the communication mitigation techniques can include the specification of immediate actions to be taken by the communication management system 102. In one example, a user of the mobile communication device 102 can request an override of the determined unavailability of the mobile device. In another example, a third party associated with the communication device 112 can request a page channel to the user of the mobile device 104 to request an override. In a further example, a third party associated with the communication device 112 can request an emergency breakthrough to establish the requested communication channel with the mobile communication device. In still a further example, either the user associated with the mobile communication device 104 or the third party user associated with the communication device 112 can request from several predefined messages to be played to the other users (such as a predetermined message requesting a driver to pull over to be able to take a call). In still a further embodiment, the communication processing component 204 may initiate a timer or counter that specifies a time limit for the user of the mobile device 104 to change the environment prior to the termination of an established communication channel or to allow for the initiation of the established communication channel.

In yet another embodiment of communication channel mitigation techniques, the communication processing component 204 can implement additional notifications to the parties requesting the communication channel or involved in an existing communication channel. The notification can include a specification of the available alternative mitigation options (described above), an explanation of why the communication channel was not authorized or is to be terminated and/or details regarding the timing for the termination of an existing communication channel. For example, when the communication management system 102 routes an incoming call to voicemail as the result of unavailability (e.g., the callee's mobile device is in an "in transit/city" context), an outgoing message may be played to the third party communication device 112. Different messages (which may but need not be prerecorded by the callee) may be played or generated depending upon whether the context is "in transit/city," "in-transit/highway," "in meeting," "in geospatial zone," "on the phone," etc. Further, the communication management system 102 may output an auto-generated audible message to the caller with information about the expected or estimated future availability of the mobile communication device user. For instance, if imported calendar information indicates that the mobile communication device user is in a meeting, the mitigation component 206 may output an audible message indicating (1) the scheduled end time of, or number of minutes remaining in, the meeting, and (2) the amount of free time until the next meeting. As another example, if the mobile communication device user is in a geospatial zone, the auto-generated message may indicate an estimated amount of time until the mobile communication device is predicted to exit the geospatial zone. The mobile communication device 104 may generate such estimates automatically while in a geospatial zone as part of the context assessment algorithm, and/or may periodically communicate such estimates (or significant changes thereto) to the communication management system 102.

D. Provisioning of Mobile Communication Device Profiles

Figure 10:
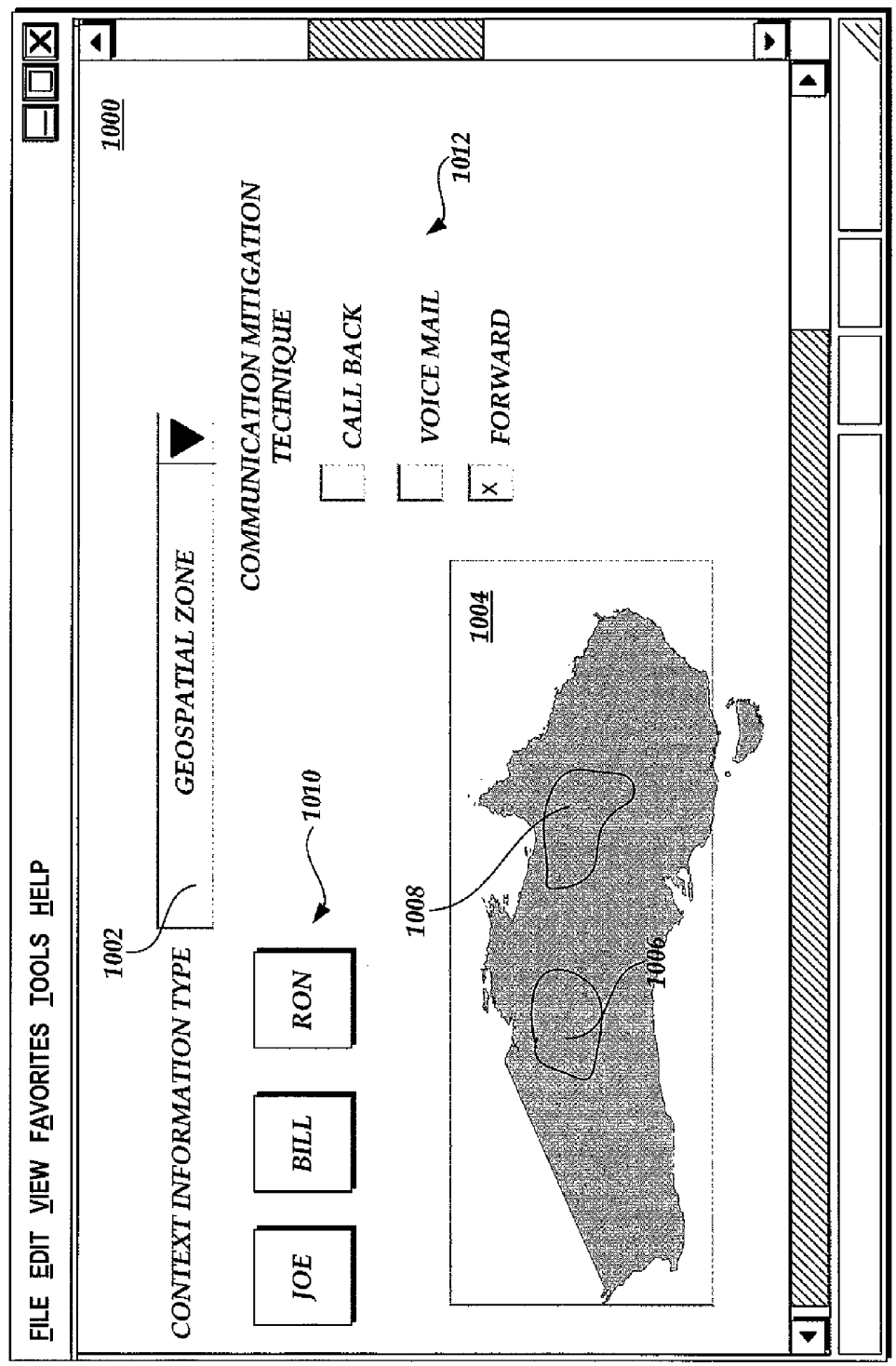
FIG. 10 is a block diagram illustrative of a screen display of a user interface for obtaining mobile communication device profile information for managing mobile communication device availability based on mobile communication device context information.

With reference now to FIG. 10, an illustrative screen display 1000 indicative of a user interface for provisioning mobile communication device profiles will be described. In an illustrative embodiment, the screen display 1000 may be generated by the mobile communication device 104 or a user at a computing device 116. The provisioning may correspond to administrator level policies set forth by enterprises, service providers, or authorities. Additionally, the provisioning may correspond to policies set forth by additional identified users, such as parents. One skilled in the relevant art will appreciate that any number of interfaces may be generated. Additionally, various interfaces may be configured to correspond to the display capabilities and/or requirements of the device generating the display. Additionally, various interfaces may be presented according to the defined context.

With reference to FIG. 10, the screen display 1000 can include a first section 1002 for specifying a profile for particular type of context information. As illustrated in FIG. 10, the section 1002 specifies that availability information is being defined for one or more geospatial zones. The section 1002 may correspond to a number of available context information categories, such as a pick list or a drop down box. As also illustrated in FIG. 10, the screen display can include a map overlay section 1004 for provisioning the boundaries of the geospatial zone. The overlay section can correspond to map information published by the communication management system 102 or additional third parties. For example, the overlay section 1004 may be an existing street map that includes icons indicative of well known or specified establishments. In an illustrative embodiment, the geospatial zones may default to a selection of communication unavailability within the geospatial zone. Alternatively, a user may be able to specify the availability for the geospatial region based on context information or specific users or groups of users.

The screen interface 1000 can further include any number of graphic indicators of geospatial zones 1006, 1008 that will define the boundaries of the geospatial zones. In an illustrative embodiment, the graphic indicators may be generated via various drawing tools provided on the interface 1000. In another embodiment, the graphic indicators may be generated by the indication of the coordinates of endpoints and intersections of the boundaries. In still a further embodiment, the interface 1000 may be provisioned with predefined geospatial boundaries that have been provided by the communication management system 102 and/or published by other users.

In another embodiment, the geospatial boundaries can be generated by the entry of location coordinates by the user via a mobile device 104. In this embodiment, a user can utilize location information, such as GPS information, to indicate the coordinates of geospatial boundaries when the mobile device is at the coordinates. For example, the user can select a control or provide data via the mobile device to indicate the location of the boundaries.

With continued reference to FIG. 10, as previously described, the profile information may also be specified for specific users or groups of users. In accordance with an alternative embodiment, the screen interface can include a representation of users or individuals as a set of icons 1010 that can be manipulated to selection the application of a geospatial zone and selected availability. For example, a user can manipulate the icons 1010 via a drag and drop technique to apply a geospatial boundary and associated availability by dropping the icon on the selected geospatial zone or vice versa. The screen interface 1000 may also include a section 1012 in which a user can specify a type of communication mitigation technique to be applied in the event of unavailability. As illustrated in FIG. 10, a communication forward mitigation technique has been specified.

Figure 11:
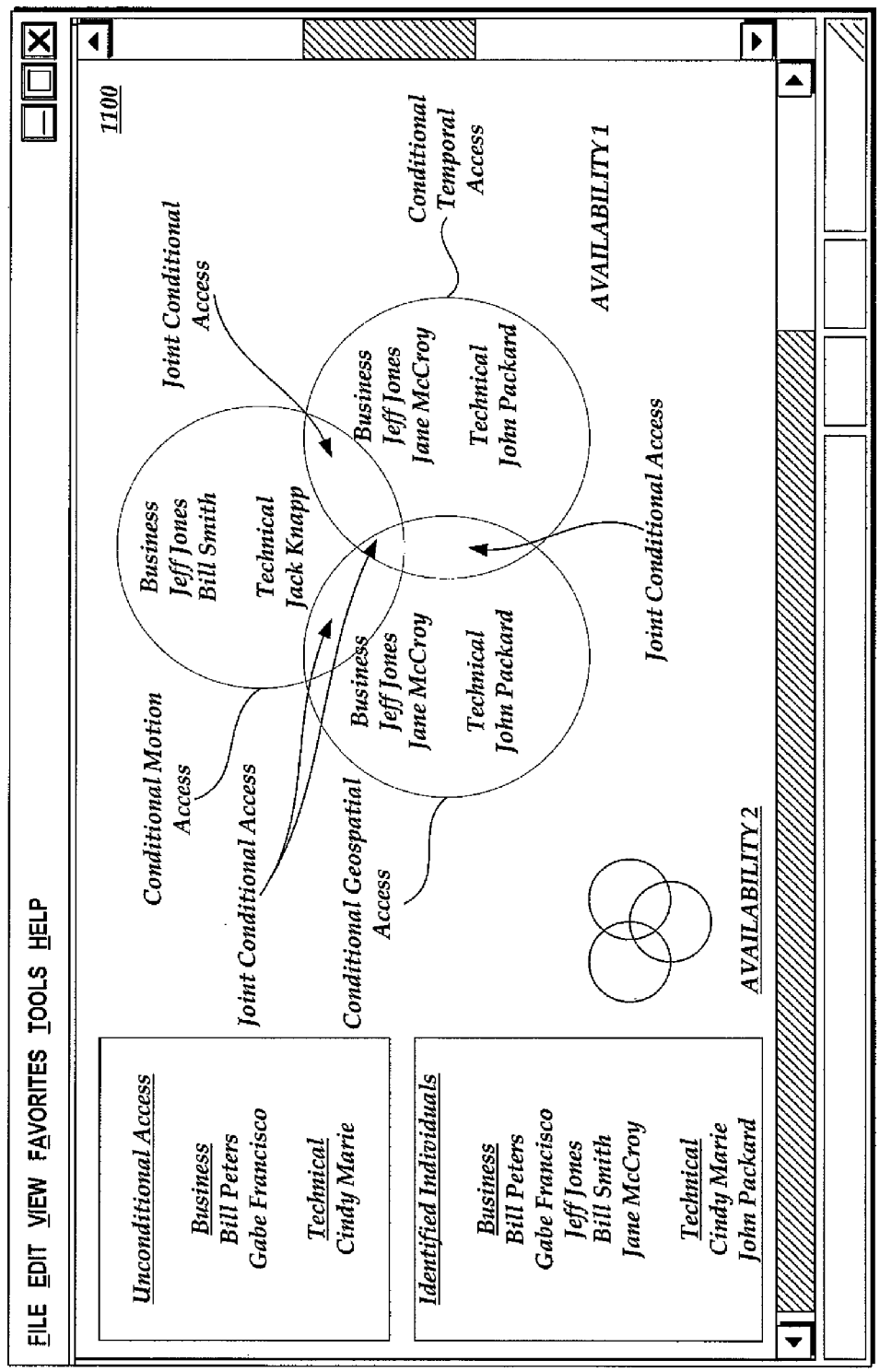
FIG. 11 is a block diagram illustrative of a screen display of a user interface for obtaining mobile communication device profile information for managing mobile communication device availability based on mobile communication device context information.

FIG. 11 is a block diagram illustrative of a screen display 1100 of a user interface for obtaining mobile communication device profile information for managing mobile communication device availability based on mobile communication device context information. The screen display 1100 facilitates the specification and management of profiles for individuals or groups of individuals. As illustrated in FIG. 11, the screen display 1100 corresponds to a display of geometric shapes (e.g., circles) that correspond to determined availability based context information. Display objects corresponding to identified individuals can be placed in the geometric shapes to associate the identified individual with the determined availability. Information identified individuals may correspond to information obtained from a network resource, such as a contact list. The association is stored in the mobile device profiles. Additionally, summaries of the associations can be displayed in the screen display 1100.

E. Additional Embodiments

In accordance with still another illustrative embodiment, the communications management component 102 may utilize learned behaviors or predictive behaviors to provision the mobile communication device profiles and/or to determine the availability of the mobile communication device 104. In accordance with this embodiment, communication management component 102 may track various behaviors or mobile communication device usage in the mobile communications device profile data store 210. For example, the communications management component 102 may track the length of audio conversations between specific users or groups of users. In another example, the communications management component 102 may also track the timing of requests for communication channels on a daily, weekly, or monthly basis. In still a further example, the communication management system 102 may track previous determined unavailability to generate a model of availability for users based on time of day or based on events. With continued reference to the example, the communications management component 102 may associate events on a calendar (such as specific reoccurring meetings) with mobile communication device context information that generates a determination of unavailability (such as traveling within a defined geospatial zone). Accordingly, a profile may be provisioned such that the communication processing component 204 may utilize user calendaring function inputs to determine unavailability in advance. Additionally, users may be asked to identify specific or notable events that facilitate the learned behavior approach.

In a related embodiment, the communication processing component 204 may also utilize learned behavior to adjust a determination of availability. For example, assume that an identified user typically has audio communications with another user for 20 minutes or greater on a frequent basis. Also assume that at current time, the mobile device is available for audio communication channels. However, the current bearing and velocity will likely place the mobile communication device 104 within a geospatial zone defining unavailability in the next 10 minutes of travel.

In this embodiment, the communication processing component 204 can include learned behaviors to determine whether it would have to likely terminate the communications channel. If so, the communication processing component 204 may adjust the determination of availability in the event that the anticipated time of the communication channel cannot be completed. Thus, in the above example, the communication processing component 204 can determine that the user will likely be entering a geospatial zone based on a current velocity and bearing. Additionally, because of learned behaviors or historical knowledge, the communication processing component 204 can anticipate that the length of the audio communication and will require the communication channel to be terminated when the mobile communications device enters the geospatial zone. Accordingly, the communication processing component 204 may choose, based on its own configurations or a configuration specified by the user, to not authorize the communications channel and offer a selection of communication mitigation approaches.

In another example, the communication processing component 204 can monitor a user's repeated selection of communication mitigation techniques as part of an interactive voice response as a function of an identified user or a specific mobile device context. Accordingly, the communication processing component 204 may update applicable mobile communication device profiles in view of a number of predetermined selections of communication mitigation techniques.

In still another example, the communication processing component 204 can monitor a determination of repeated unavailability according to a time of day or other identified event. Accordingly, the communication processing component 204 may update applicable mobile communication device profiles in view of a number of determinations such that a profile can specify automatically specify unavailability as a function of the determined time of day or event. For example, if a mobile communication device 104 is determined to be unavailable every for two consecutive weeks at the same time, the communication processing component 204 may update a profile to make the unavailability determine a function of time.

In yet a further example, communication processing component 204 can monitor a number of communication requests from a previously unidentified third party communication device 112 or for a communication device that is not associated with a mobile communication device profile. After a number of repeated communication requests, the communication processing component 204 may automatically create a mobile communication device profile or prompt a user for the creation of the mobile communication device profile for such third party communication device. The communication processing component 204 can automatically populate some or all of the aspects of the profile based on the previously monitored activity. Additionally, it can import a template of profile information set by the user, an administrator, or a service provider.

In accordance with another embodiment, the context information and/or availability generated by the mobile communication device 104 or the communications management component 102 may be published to additional information sources/repositories, such as network resources. In one example, the mobile device 104 or communications management component 102 may publish a set of the geospatial zones that a user has created. The published geospatial zones may be used by other system users to provision mobile communication device profiles. The published geospatial zones may be utilized to describe/publish the context information that will be used by the communications management component 102 to determine availability.

In another embodiment, the mobile communication device context information may be published to other information sources/repositories to publish the current or past mobile device contexts. In one example, the mobile device context information can be linked with a personal Web page of a user, such that context information (e.g., in transit) is published on the Web page. In another example, the mobile device context information can be linked with a calendaring function to determine whether the user is on schedule. If for example a user remains in a city/urban transit state due to traffic conditions, subsequent appointments may need to be rescheduled or cancelled. Accordingly, a control algorithm may automatically cancel meetings or provide appropriate notifications. In still another embodiment, the determination of a proximity to a geospatial zone or entry into a geospatial zone may be published to a third party source to initiate additional actions (e.g., a communication to security personnel).

In still another embodiment, the mobile communication device availability information may also be published to other information sources/repositories. Similar to the published context information, the mobile device availability information can be linked with a personal Web page of a user, such that availability information (e.g., in transit) is published on the Web page. In another example, the mobile device availability information can be linked with a calendaring function and published to allow for scheduling of current or future events. In still a further example, the published availability information (historical and current) may be used to generate and published a model of availability. In such an embodiment, other users may be presented with opportunities for predictive availability. Still further, the availability information may be filtered according to the authorization to different users or classes of users.

Bypassing Mitigation Services

As previously described, in one embodiment, the communication processing component 204 manages a subscriber terminal state with regard to whether call mitigation services should be applied to a communication request to the mobile device 104. In scenarios involving the communication between a mobile device 104 and a PSAP center 114, the communication processing component 204 can utilized mobile device context state to determine whether communication mitigation techniques should be bypassed.

Figure 12A:
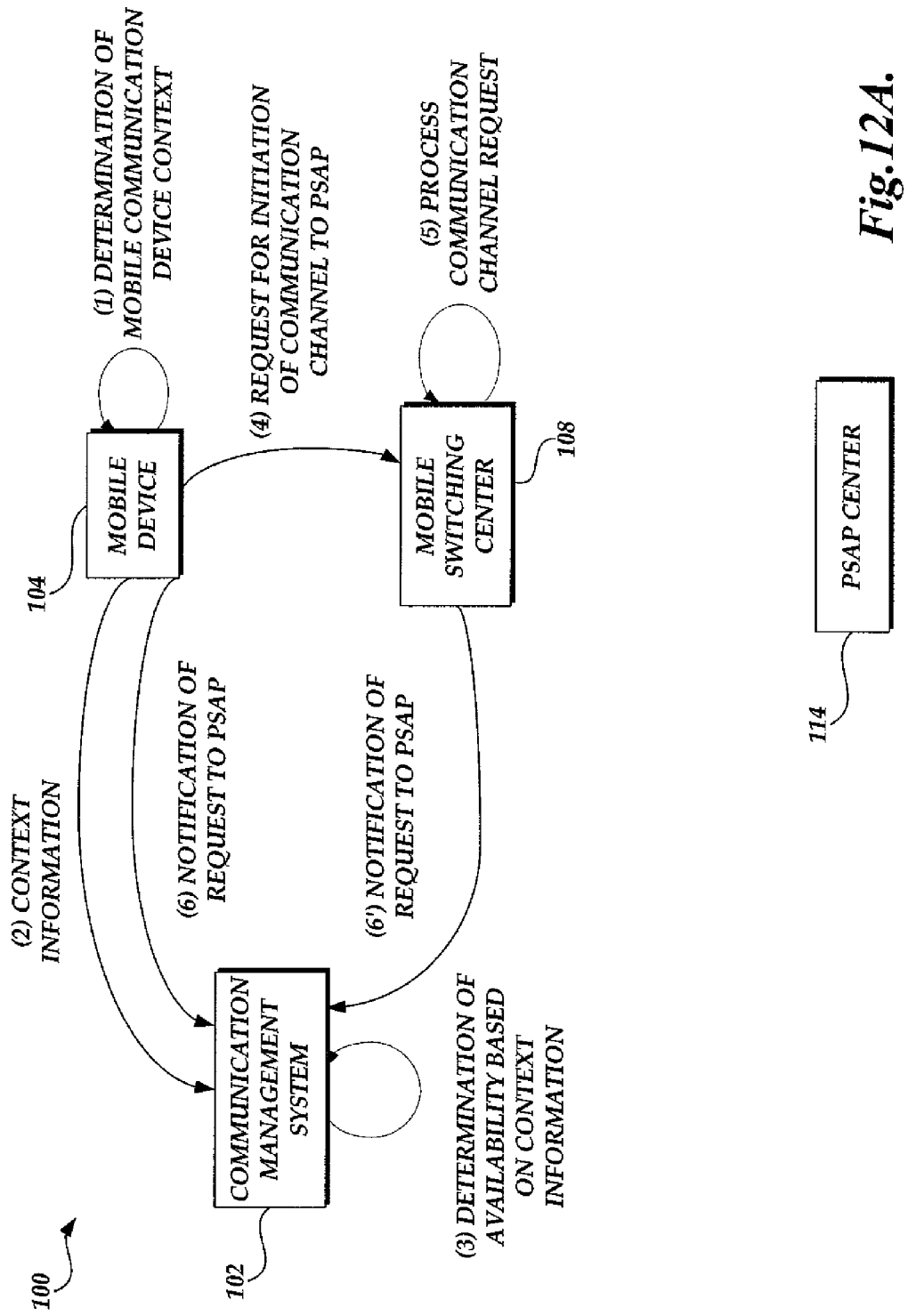
Figure 12C:
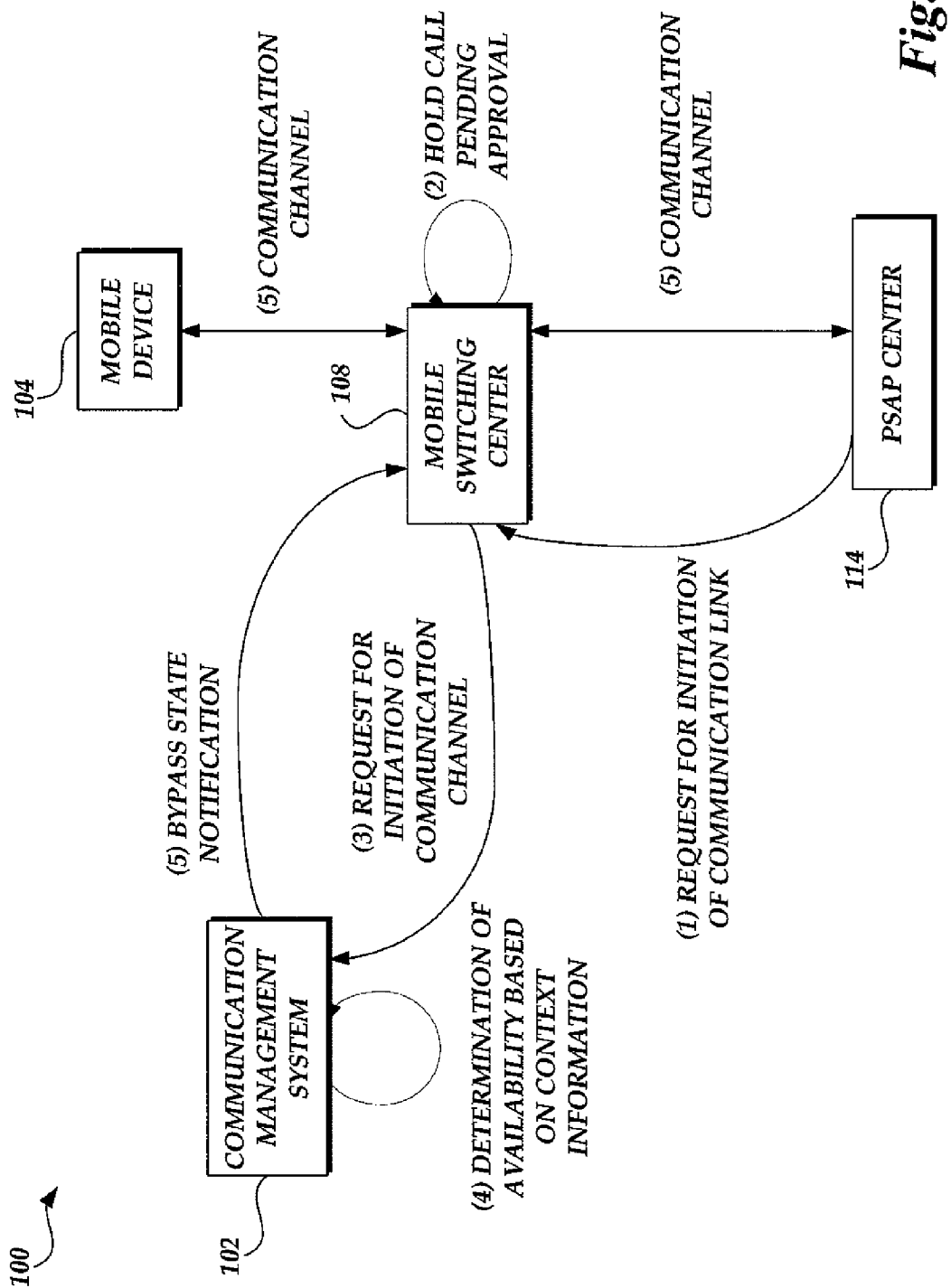

With reference now to an illustrative interaction if FIGS. 12A-12C, as illustrated in FIG. 12A (and previously described), during the operation of the mobile communication device 104, or during an initialization of the mobile communication device, the mobile communication device interface component 306 obtains a set of inputs corresponding to the mobile communication device environment. The set of inputs are processed by the mobile communication device context processing component 304 to generate mobile communication device context information. The communication management system communication component 302 then transmits the mobile communication device context information to the communication management system 102 as appropriate. Specifically, to reduce power consumption and/or bandwidth consumption, the communication management system communication component 302 may limit the transmission of mobile communication device context information for the initialization of a mobile communication device context, a detection of a change in mobile communication device context and/or for the re-establishment of a mobile communication device context.

Upon receipt of the context information, the mobile device communication component 202 transmits the context information to the communication processing component 204 for processing. The communication processing component 204 obtains one or more corresponding, or applicable, mobile communication device profiles from the mobile communication device profile data store 210. The communication processing component 204 then determines the availability of the mobile communication device to establish a communication channel (either receipt of a request or the initiation of a request) based on the processing.

Thereafter, in the illustrative example of FIG. 12A, the mobile device 104 initiates a request to establish a communication channel with a communication device 112, such as a PSAP center 114. In the illustrative embodiment, the initiation of a request to establish a communication channel with the PSAP center 114 can be designated as a communication in which communication mitigation techniques may be bypassed. In such a situation, the mobile device 104 can be referred to as entering a bypass state. In one example, the mobile switching center 108 or communication management system 102 may be able to classify the call as requiring a bypass state based on the contact information (e.g. phone number or other call identification information) of the communication device 112. In another example, the mobile device 104 may independently transmit a notification that requests that the phone enter into a bypass state or information that allows the communication management system 102 to determine that the mobile device 104 should be designated in a bypass state. In another example, the receiving communication device 112 can provide an independent notification that the requesting mobile device 104 be designated as entering a bypass state. Accordingly, the communication management system 102 can determine that the mobile device 104 should be designated in a bypass state. By way of illustrative example, in an emergency situation in which safety personnel such as police, ambulance, or firefighting personnel have been contacted, one or more mobile devices 104 may be designated for entering into a bypass state.

With reference to FIG. 12B, upon receipt of the notifications or information regarding the bypass state, the communication management system 102 updates the determination of the context information associated with the mobile device 104. In an additional embodiment, the communication management system 102 may also update the context information for other devices that may be associated with a designated mobile device 104. For example, in the case of an emergency, such as a building lockdown, the communication management system 102 may designate all employees having company affiliated mobile devices to be in a bypass state. In an illustrative embodiment, the communication management system 102 can maintain logs of the information that can be used for billing purposes (e.g., billing for emergency calls) or other auditing purposes. Additionally, the communication management system 102 can implement additional notification routines that information other users and/or identified devices of the bypass state. The notification routines may be stored or configured for the subscriber. With regard to the mobile device 104 requesting the communication channel, the mobile switching center 108 establishes the communication channel between the communication device, such as PSAP center 114 and the mobile device.

Turning now to FIG. 12C, if the communication channel between the PSAP center 114 and mobile device 104 is terminated prematurely, the PSAP center 114 will attempt to initiate a call to the mobile device 104 of the subscriber that initiated the call. The telephony network will complete the call back towards the mobile switching center 108 that is serving the mobile device 104 in the normal fashion. At each stage in the call completion as the call traverses the mobile switching center 108 elements in the network, the mobile switching center 108 may be instructed to run advanced call mitigation services (as described above). If this is the case, then prior to invoking any query to a screening service, the mobile switching center 108 will invoke a query toward the communication management system 102 for the mobile device 104. In the case of the illustrative dropped PSAP center communication channel, the communication management system 102 will notify the mobile switching center 108 that the mobile device 104 is currently in a bypass state. The mobile switching center 108 will then bypass any advanced subscriber services (e.g., communication mitigation services). Additionally, the communication management system 102 can classify the call (e.g., an emergency call or a classified call) and associate priority routing/designation. The communication channel can be reestablished.

The bypass state designation for a mobile device 104 can persist until it is cleared either by the network, or by the mobile device 104. For example, the bypass state can be cleared based on subsequent activity initiated by the mobile device 104, such as transmitting an explicit request to terminate the bypass request, initiating a communication request to a device not associated with the bypass state (e.g., a call with nonemergency personnel), and the like. The bypass state designated for a mobile device 104 can also be cleared by the network a prescribed amount of time after the state is initiated, i.e. the state times out in the communication management system 102.

Figure 13:
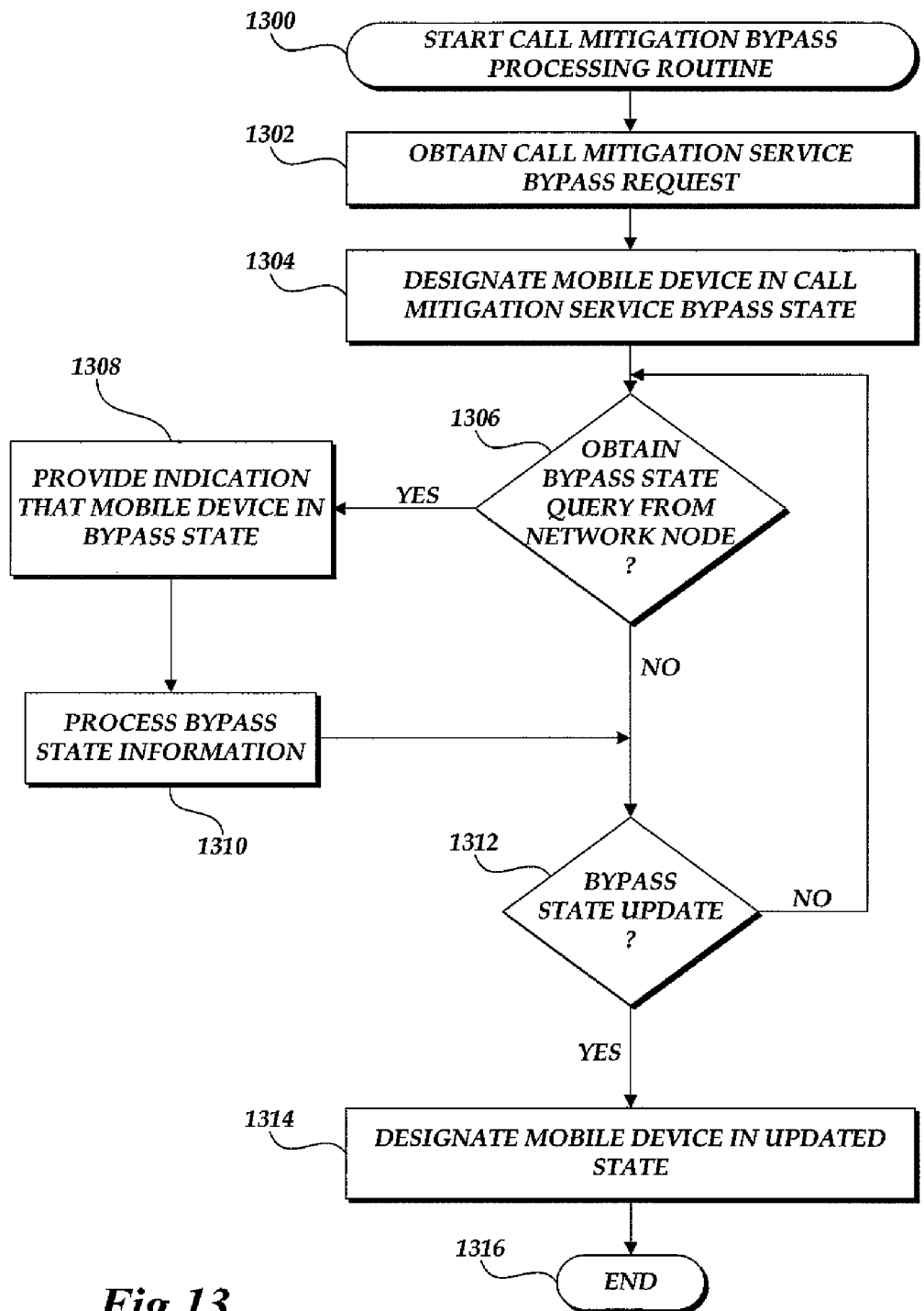
FIG. 13 is a flow diagram illustrative of a call mitigation bypassing processing routine implemented by a communication management component.

With reference now to FIG. 13, a flow diagram illustrative of a call mitigation bypassing processing routine 1300 implemented by a communication management component 102 will be described. At block 1302, the communication management component 102 obtains a call mitigation service bypass request. As described above, in one embodiment, the mobile device 104, mobile switching center 108, or other component may specifically transmit the request to the communication management system 102. Alternatively, the mobile device 104, mobile switching center 108, or other components may transmit information (independently or cumulatively) that facilitates the determination of mobile device context. At block 1304, the communication management system 102 designates the mobile device 103 in a bypass state. In one embodiment, in the event that the communication management system 102 supports multiple call mitigation or call bypass services, the designation of a bypass state may be with regard to specific services, types/classes of services or all services.

At decision block 1306, the communication management system 102 a test is conducted to determine whether the communication management system 102 has obtained a bypass state query from the mobile switch center 108. As previously described, the request may originate from a device, e.g., the PSAP center 114, previously associated with the bypass state or an independent communication device 112. Still further, the request may originate from the mobile device 104 associated with the bypass state. If the communication management system 102 obtains the bypass state query (e.g. a communication channel request), the communication management system 102 provides an indication to the mobile device 104 is associated with a bypass state at block 1308 as applicable. In one example, if the communication request corresponds to a component also associated with the bypass state designation, the communication management system 102 can identify the parties accordingly and communication mitigation procedures may be bypassed. In another example, if the communication request corresponds to a component not otherwise associated with the bypass state, the communication management system 102 can identify the parties accordingly and the communication mitigation procedures may still apply.

At block 1310, the communication management system 102 processes the bypass state information. In an illustrative embodiment, the communication management system 102 can determine whether it should update the bypass state information previously associated with the device. For example, if the mobile device 104 has initiated a subsequent communication channel request to a component not otherwise associated with the previous bypass state, the communication management system 102 can determine that the mobile device 104 should not longer be designated as in the bypass state. In another example, if additional components are associated with the bypass state, the communication management system 102 may escalate the designation of the bypass state, adjust the priority of routing, and the like.

With reference to decision block 1304, if the communication management system 102 has not received a query from the mobile switching center 108 (decision block 1306) or after processing the bypass state information (block 1310), the communication management system 102 determines whether the bypass state information has been updated. If the bypass information has not been updated, the routine 1300 returns to decision block 1306. If the bypass information has been updated, the communication management system 102 designates the mobile device 104 in the updated state and the routine 1300 terminates.

Figure 14:
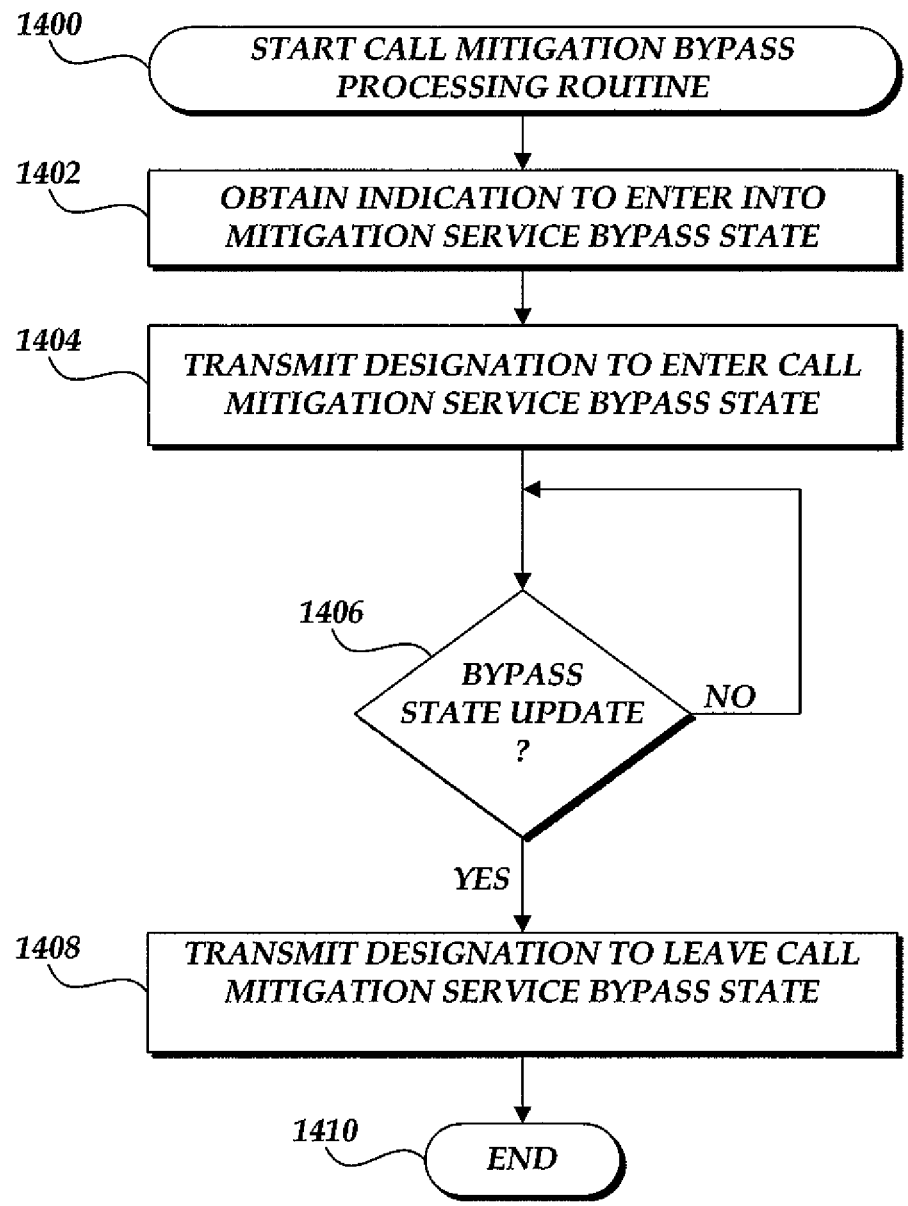
FIG. 14 is a flow diagram illustrative of a call mitigation bypass initiation routine implemented by a mobile device.

Turning now to FIG. 14, a flow diagram illustrative of a call mitigation bypass initiation routine 1400 implemented by a mobile device 104 will be described. At block 1402, the mobile device 104 obtains a designation to enter into a bypass state. In one embodiment, a mobile device may include interfaces, such as buttons, soft buttons, display objects, voice prompts, etc., that can be used to obtain a designation by a user to enter into a bypass state. In another embodiment, the designation may be inferred by the recognition of specific words, telephone numbers, addressing, and the like. In that embodiment, the mobile device 104 may be configured specifically by a user to make such inferences. At block 1404, the mobile device 104 can transmit the obtained designation. Illustratively, the designation may be transmitted to a communication management system 102 or the mobile switch center 108 as a separate transmission or as part of a communication request.

Thereafter, assuming the mobile device 104 has been associated with a bypass state, at decision block 1406, a test is conducted to determine whether the bypass state should be updated. In one embodiment, the mobile device may use the same (or different) interfaces, such as buttons, soft buttons, display objects, voice prompts, etc., that can be used to obtain a designation by a user to enter modify the bypass state. In another embodiment, the mobile device 104 may determine an intent to update the bypass state by the passage of time without activity, keywords, the request to generate subsequent communication channels, and the like. The determination of a request to modify the bypass state may be in conjunction with another component (such as the communication management system 102) or independent from other components.

If the bypass state should not be updated, the routine 1400 returns to decision block 1406. Alternatively, if the bypass state should be updated, the mobile device 104 transmits the designation to update the bypass state. In the same manner described above, the designation may be transmitted to a communication management system 102 or the mobile switch center 108 as a separate transmission or as part of a communication request. The routine 1400 terminates at block 1410.

Figure 15:
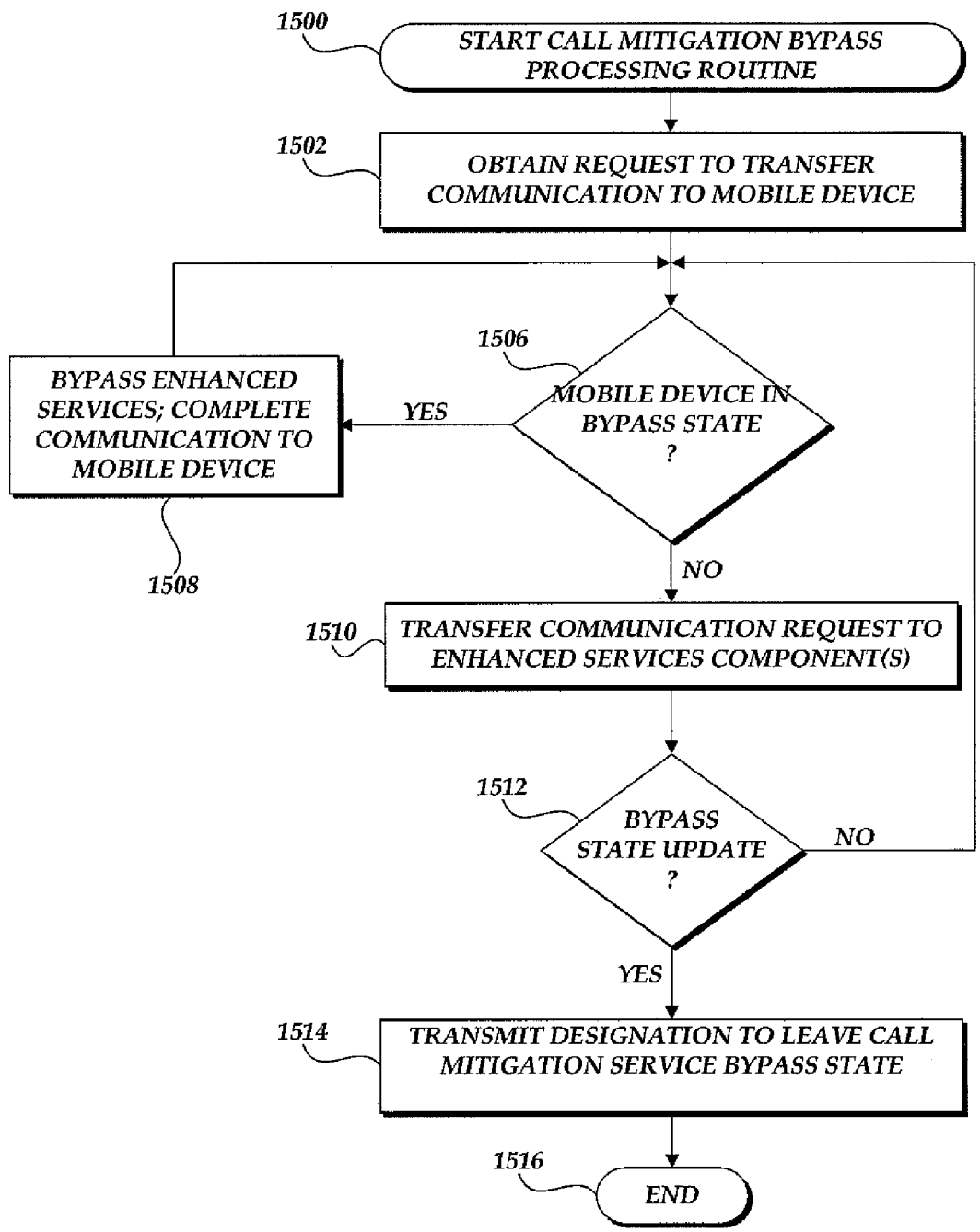
FIG. 15 is a flow diagram illustrative of a call mitigation bypass processing routine implemented by a network node.

Turning now to FIG. 15, a flow diagram illustrative of a call mitigation bypass processing routine 1500 implemented by a network node, such as the mobile switching center 108, will be described. At block 1502, the mobile switching center 108 obtains a request to transfer communications to a mobile device 104. At decision block 1506, a test is conducted to determine whether the designated mobile device 104 is associated with a bypass state. If the mobile device 104 is associated with a bypass state, the mobile switching center 108 bypasses any otherwise applicable enhanced services and completes the communication channel request to the designated mobile device 104. In an embodiment having multiple potential bypass states, the mobile switching center 108 may determine whether the associated bypass state would apply to the requested communication. The routine 1500 returns to decision block 1506 to wait for further communication requests.

If the mobile device is not in a bypass state at decision block 1506, at block 1510, the mobile switching center 108 transfers the communication request to an appropriate enhanced services component, such as a call mitigation component. The request can be process in the manner described above. At decision block 1512, a test is conducted to determine whether the bypass state should be updated. As previously described, a request to update a bypass state may be transmitted from a mobile device 104 or determined by the communication management system 102. Additionally, the mobile switching center 108 can also determine whether a bypass state should be updated based on information associated with the requested communication channel (e.g., the initiation of a call by the mobile device 104) or other information. If the bypass state should not be updated, the routine 1500 returns to block 1506. If the bypass state should be updated, the mobile switching center 108 transmits the designation of updating the bypass state to the communications management system 102 and the routine 1500 terminates.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A computer-implemented method, comprising:
receiving context change notification messages transmitted by a mobile communications device indicating one of a set of pre-defined context states as a current context state of the mobile communications device, wherein said set of pre-defined context states are based at least in part on motion-based context assessments performed by the mobile communications device, and are reflective of a user risk level associated with using the mobile communications device to engage in a communications session, wherein each of the set of pre-defined context states is representative of processing, by the mobile communication device, of a set of determined mobile device environment information within a defined range of potential mobile device environment information, wherein each context change notification message is transmitted by the mobile communication device independent of external requests for context change notification messages and only after the mobile communication device has determined that a change of mobile communication device context state has occurred, wherein the context change notification messages are received independent of requests to route incoming or outgoing calls, and wherein management of incoming requests for communication to the mobile communications device, outgoing requests for communication from the mobile communications device, or ongoing communications including the mobile communication device is defined in terms of the current context state without processing the set of mobile device environment information on which the current context state is based;

maintaining state data in computer storage based, at least in part, on the received context change notification messages, wherein the state data is maintained and updated in said computer storage at least during time periods in which the mobile communications device is not being used by the user, said computer storage being separate from the mobile communications device; and in response to an incoming request to establish a communication session, determining, independent of processing the set of mobile device environment information on which the current context state is based, whether the management of the incoming request, as defined by received context change notification messages, corresponds to providing enhanced communication services, wherein the enhanced communication services correspond to management of incoming requests for communication to the mobile communications device, outgoing requests for communication from the mobile communications device, or ongoing communications including the mobile communication device, and wherein the enhanced communication services do not cause a modification of a functionality of the mobile communication device;

receiving updated context change notification messages indicating a second context state of the set of pre-defined context states as an updated context state of the mobile communications device, the updated context change notification messages associated with a user request for initiation of an enhanced service bypass state, the user request comprising criteria for determining whether to enable the enhanced communication services with respect to an incoming request for communication;

associating the mobile communications device with updated state data, the updated state data at least reflecting an enhanced service bypass state; and in response to a second incoming request to establish a communication session and independent of processing the set of mobile device environment information on which the updated context state is based, determining whether the management of the incoming request, as defined by updated context change notification messages, corresponds to providing enhanced communication services in accordance with the user request for initiation of the enhanced service bypass state, wherein the management of the incoming request is defined at least in part based on the criteria for determining whether to enable the enhanced communication services with respect to an incoming request for communication.

2. The computer-implemented method as recited in claim 1, wherein receiving updated context change notification messages includes receiving updated context change notification messages directly from the mobile communications device.

3. The computer-implemented method as recited in claim 1, wherein receiving updated context change notification messages includes receiving updated context change notification messages from the mobile communications device via a network node.

4. The computer-implemented method as recited in claim 1, wherein the mobile telecommunications device can be associated with two or more enhanced communication services bypass states.

5. The computer-implemented method as recited in claim 4, wherein associating the mobile communications device with updated state data, the updated state data at least reflecting an enhanced service bypass state includes selecting at least one of the two or more enhanced communication services bypass states.

6. The computer-implemented method as recited in claim 4, wherein associating the mobile communications device with updated state data, the updated state data at least reflecting an enhanced service bypass state includes selecting a single enhanced service bypass state from the two or more enhanced communication services bypass states.

7. The computer-implemented method as recited in claim 4 further comprising:
receiving further updated context change notification messages indicating additional updated context states of the mobile device; and
associating the mobile communications device with updated state data, the updated state data at least reflecting a different enhanced service bypass state from the two or more enhanced communication services bypass states.

8. The computer-implemented method as recited in claim 1, wherein associating the mobile communications device with updated state data include associating the mobile communication device with a communication priority based on the enhanced communication services bypass state data.

9. The computer-implemented method as recited in claim 1, wherein in response to a second incoming request to establish a communication session, using at least the updated state data, as maintained in said computer storage prior receipt of said request, to determine, at least, whether to provide enhanced communication services includes bypassing the enhanced communication services for any component associated with the bypass state.

10. The computer-implemented method as recited in claim 1, wherein determining whether the management of the incoming request as defined by updated context change notification messages, corresponds to providing enhanced communication services in accordance with the user request for initiation of the enhanced service bypass state includes providing the enhanced communication services for any component not associated with the bypass state.

11. The computer-implemented method as recited in claim 1 further comprising associating the mobile communications device with further updated state data, the updated state data at least reflecting a removal of the enhanced service bypass state based upon receipt of the second incoming request to establish a communication session.

12. The computer-implemented method as recited in claim 11, wherein the second incoming request to establish a communication session is initiated by the mobile telecommunications device.

13. The computer-implemented method as recited in claim 1 further comprising:
collecting information associated with the bypassing of enhanced communication services; and
transmitting the collected information to least one additional component.

14. The computer-implemented method as recited in claim 1, wherein the bypass state is associated with an emergency.

15. The computer-implemented method as recited in claim 1, wherein the bypass state is associated with a corporate affiliation.

16. A system for managing communications associated with a mobile communication device comprising:
a mobile communication device interface for bilateral communications with a mobile communication device, wherein the mobile communication device interface obtains mobile communication device context notifications indicating one of a set of pre-defined context states as a current context state of the mobile communications device, wherein said set of pre-defined context states are based at least in part on motion-based context assessments performed by the mobile communications device, and are reflective of a user risk level associated with using the mobile communications device to engage in a communications session;
wherein each of the obtained mobile communication device context notifications is representative of processing, by the mobile communication device, of a set of determined mobile device environment information within a defined range of potential mobile device environment information corresponding to an individual context state of the set of pre-defined context states,
wherein the mobile communication device context notification is transmitted by the mobile communication device independent of external requests for mobile communication device context notifications and only after the mobile communication device has determined that a change of mobile communication device context state has occurred, wherein the mobile communication device context notification is received independent of requests to route incoming or outgoing calls, and
wherein management of requests for communication with the mobile communications device is defined in terms of the current context state indicated within the mobile communication device context notifications without processing the set of mobile device environment information on which the context change notifications are based;
a mobile communication device data store for maintaining mobile communication device availability profiles according to the context states indicated within the obtained mobile communication device context notifications, wherein the mobile communication device availability is determined asynchronously to communication requests and includes designation of enhanced communication services bypass states, wherein the enhanced communication services bypass states are determined according to a user request for bypass of enhanced communication services, wherein the user request comprises criteria for determining whether to enable the enhanced communication services with respect to a request for communication, and wherein the enhanced communication services do not cause a modification of a functionality of the mobile communication device; and
a communication management component for implementing, based at least in part on the mobile communication device profiles, management of communications between the mobile communication device and a third-party communication device as defined in terms of the context states indicated within the obtained mobile communication device context notifications without processing, by the communication management component, the set of mobile device environment information on which the context change notifications are based and for providing alternative communication links between the mobile communication device and the third-party communication device in accordance with the enhanced communication services, the communication management component further implementing bypass of enhanced communication services as defined within a user request for bypass and further based on the criteria included within the user request for determining whether to enable the enhanced communication services with respect to a request for communication included within the user request.

17. The system as recited in claim 16, wherein the mobile telecommunications device can be associated with two or more enhanced communication services bypass states.

18. The system as recited in claim 17, wherein the communication management component associates the mobile communications device with an updated mobile communication device availability based on receipt of the user requests for bypass of enhanced communication services, the updated mobile communication device availability at least reflecting a selection of at least one of the two or more enhanced communication services bypass states.

19. The system as recited in claim 17, wherein the communication management component associates the mobile communications device with an updated mobile communication device availability based on receipt of the user requests for bypass of enhanced communication services, the updated mobile communication device availability at least reflecting a selection of a single enhanced service bypass state from the two or more enhanced communication services bypass states.

20. The system as recited in claim 17 wherein the communication management component is further operable to receive updated mobile communication device context notifications corresponding to the mobile communications device and associate the mobile communications device with an updated mobile communication device availability reflecting a different enhanced service bypass state from the two or more enhanced communication services bypass states.

21. The system as recited in claim 16, wherein the communication management component associates the mobile communications device with a communication priority based on the designated enhanced communication services bypass states.

22. The system as recited in claim 16, wherein the communication management component causes a network node to bypass enhanced communication services for any component associated with the bypass state.

23. The system as recited in claim 16, wherein the communication management component is further operable to remove an association of an enhanced communication services bypass state based an updated assessment of mobile communication device context.

24. The system as recited in claim 23, wherein the removal of the enhanced service bypass state based upon receipt of the second incoming request to establish a communication session.

25. The system as recited in claim 16, wherein the communication management component is further operable to collect information associated with the bypassing of enhanced communication services and transmit the collected information to least one additional component.

26. The system as recited in claim 16, wherein the bypass state is associated with an emergency.

27. The system as recited in claim 16, wherein the bypass state is associated with a corporate affiliation.

28. The system as recited in claim 16, wherein the communication management component is further operable to associate an enhanced communications services bypass state to at least one other mobile communication device associated with the mobile communication device.

29. A method for managing communications associated with a mobile communication device comprising:

maintaining a mobile communication device profile, wherein the mobile communication device profile defines criteria for processing communications between a third-party communication device and the mobile communication device based on a current mobile communication device context of a set of pre-defined mobile communication device contexts independent of processing mobile device environment information on which the current mobile communication device context is based, wherein said set of pre-defined context states are based at least in part on motion-based context assessments performed by the mobile communications device, and are reflective of a user risk level associated with using the mobile communications device to engage in a communications session;

wherein the current mobile communication device context is representative of processing, by the mobile communication device, of a set of determined mobile device environment information within a defined range of potential mobile device environment information and is transmitted by the mobile communication device independent of external requests for the current mobile communication device context and only after the mobile communication device has determined that a change of mobile communication device context has occurred, wherein the current mobile communication device context is received independent of requests to route incoming or outgoing calls, and wherein management of requests for communication including the mobile communications device is defined in terms of the current mobile communication device context;

prior to a request for communications with the third party communication device, determining, independent of processing the set of mobile device environment information on which current mobile communication device context is based, a management of communications including the mobile communications device as defined in terms of the current mobile communication device context based at least in part on the mobile device profile;

subsequently managing communications between the mobile communication device and the third-party communication device according to the defined management in terms of the current mobile communication device context, wherein managing communications includes providing a communication channel mediation response, and wherein the communication channel mediation response does not cause a modification of a functionality of the mobile communication device;

receiving an updated context mobile communication device context corresponding to the mobile communications device, the updated mobile communication device context associated with a user request for initiation of a mediation response bypass state, the user request comprising criteria for determining whether to enable the mediation response with respect to a request for communication;

selecting the mobile communication device to bypass at least a subset of the communication channel mediation response, the subset of the communication channel mediation response determined based on the user request for initiation of a mediation response bypass state; and in response to a second incoming request to establish a communication session, determining that communication channel mediation should not be initiated based on the selection of the mobile communication device and based on the criteria for determining whether to enable the mediation response with respect to a request for communication.

30. The method as recited in claim 29, wherein the mobile communication device can be associated at least one of a set of bypass states.

31. The method as recited in claim 30 further comprising selecting a plurality of the set of bypass states.

32. The method as recited in claim 30, further comprising selecting a single bypass state from the set of bypass states.

33. The method as recited in claim 29 further comprising associating the mobile communication device with a communication priority based on the enhanced communication services bypass state data.

34. The method as recited in claim 29, further comprising bypassing the communication channel mediation for only a subset of components associated with a communication environment.

35. The method as recited in claim 29 further comprising removing the selection of the mobile communication device to bypass at least a subset of the communication channel mediation response.

36. The method as recited in claim 29 further comprising:
collecting information associated with the bypassing of channel mediation response; and
transmitting the collected information to at least one additional component.

* * * * *